[12] United States Patent  
Kanemaru

(10) Patent No.: US 12,140,806 B2  
(45) Date of Patent: Nov. 12, 2024

(54) OPTICAL MODULE

(71) Applicant: SUMITOMO ELECTRIC DEVICE INNOVATIONS, INC., Kanagawa (JP)

(72) Inventor: Satoru Kanemaru, Yokohama (JP)

(73) Assignee: SUMITOMO ELECTRIC DEVICE INNOVATIONS, INC., Kanagawa (JP)

( * ) Notice: Subject to any disclaimer, the term of this patent is extended or adjusted under 35 U.S.C. 154(b) by 573 days.

(21) Appl. No.: 17/289,859

(22) PCT Filed: Jul. 1, 2020

(86) PCT No.: PCT/JP2020/025890  
§ 371 (c)(1),  
(2) Date: Apr. 29, 2021

(87) PCT Pub. No.: WO2021/002402  
PCT Pub. Date: Jan. 7, 2021

(65) Prior Publication Data  
US 2021/0405307 A1 Dec. 30, 2021

(30) Foreign Application Priority Data  
Jul. 2, 2019 (JP) .................................. 2019-123800

(51) Int. Cl.  
*G02B 6/42* (2006.01)  
*H04B 10/61* (2013.01)

(52) U.S. Cl.  
CPC ......... *G02B 6/4213* (2013.01); *G02B 6/4206* (2013.01); *G02B 6/4214* (2013.01); *H04B 10/614* (2013.01); *H04B 10/6151* (2013.01)

(58) Field of Classification Search  
CPC ................................. G02B 6/42; H04B 10/06  
(Continued)

(56) References Cited

U.S. PATENT DOCUMENTS 5,208,648 A * 5/1993 Batchelder ......... G01N 21/9505  
                                                                                               359/356  
5,220,403 A * 6/1993 Batchelder ......... G01N 21/9505  
                                                                                               356/450  
(Continued)

FOREIGN PATENT DOCUMENTS

JP    H5-158096    6/1993  
JP    H6-082723    3/1994  
(Continued)

*Primary Examiner* — Kaveh C Kianni  
(74) *Attorney, Agent, or Firm* — Smith, Gambrell & Russell, LLP.

(57) ABSTRACT

An optical module includes a first optical splitting element to split a signal beam into a first polarization component and a second polarization component, a first element having a first introduction port, a second element having a second introduction port, a first condensing part disposed between the first optical splitting element and the first introduction port and configured to condense the first polarization component toward the first introduction port, and a second condensing part disposed between the first optical splitting element and the second introduction port and configured to condense the second polarization component toward the second introduction port. An average refractive index of the second condensing part in an optical axis direction is larger than an average refractive index of the first condensing part in an optical axis direction.

15 Claims, 19 Drawing Sheets

(58) Field of Classification Search
USPC .......................................................... 385/11
See application file for complete search history.

(56) References Cited

U.S. PATENT DOCUMENTS

| | | | | |
|---|---|---|---|---|
| 6,607,313 B1* | 8/2003 | Farries | ................. | G02B 6/2861 |
| | | | | 398/152 |
| 2002/0036606 A1* | 3/2002 | Ichikawa | ............. | G09G 3/3688 |
| | | | | 345/87 |
| 2003/0095311 A1* | 5/2003 | Liu | ........................ | H04J 14/08 |
| | | | | 398/102 |
| 2010/0039707 A1* | 2/2010 | Akahane | ............... | G02B 3/0087 |
| | | | | 359/321 |
| 2015/0109623 A1* | 4/2015 | Abdulhalm | ........ | G01B 9/02004 |
| | | | | 356/479 |
| 2017/0261703 A1* | 9/2017 | Bowen | ................... | G02B 6/423 |
| 2018/0062757 A1* | 3/2018 | Watanabe | ........... | H01L 31/0232 |
| 2018/0239096 A1 | 8/2018 | Houbertz | | |
| 2019/0094463 A1* | 3/2019 | Hasegawa | ............... | G02B 6/122 |
| 2022/0113192 A1* | 4/2022 | Prel | ....................... | G01J 3/4535 |

FOREIGN PATENT DOCUMENTS

| | | | | |
|---|---|---|---|---|
| JP | 2001-036505 | 2/2001 | | |
| JP | 2017-107131 | 6/2017 | | |
| JP | 2018-533033 | 11/2018 | | |
| JP | 6922501 B2 * | 8/2021 | ......... | G02B 19/0014 |
| WO | 2016/143725 | 9/2016 | | |
| WO | WO-2016143725 A1 * | 9/2016 | ............... | G02F 2/00 |

\* cited by examiner

OPTICAL MODULE

TECHNICAL FIELD

The disclosure relates to an optical module.

This application is based upon and claims the benefit of priority from Japanese Patent Application No. 2019-123800, filed on Jul. 2, 2019, the entire contents of which are incorporated herein by reference.

BACKGROUND ART

Patent Literature 1 discloses an optical receiver for coherent light wave communication. The optical receiver includes a polarization beam splitter that polarizes and splits a signal beam, a splitting means which splits a local beam, a first optical directional coupler and a second optical directional coupler formed on the same waveguide substrate, a first light-receiving element and a second light-receiving element that receive light from each of output ends of the first optical directional coupler, and a third light-receiving element and a fourth light-receiving element that receive light from each of output ends of the second optical directional coupler.

CITATION LIST

Patent Literature

[Patent Literature 1] Japanese Unexamined Patent Publication No. H05-15809

SUMMARY OF INVENTION

An optical module according to one embodiment of the disclosure includes a first optical splitting element configured to split a signal beam including a first polarization component and a second polarization component of which polarization directions are orthogonal to each other into the first polarization component and the second polarization component, a first element having a first introduction port and configured to input the first polarization component from the first introduction port therein, a second element having a second introduction port and configured to input the second polarization component from the second introduction port therein, a first condensing part disposed between the first optical splitting element and the first introduction port and configured to condense the first polarization component toward the first introduction port, and a second condensing part disposed between the first optical splitting element and the second introduction port and configured to condense the second polarization component toward the second introduction port. An optical path length of the first polarization component from the first optical splitting element to the first condensing part is larger than an optical path length of the second polarization component from the first optical splitting element to the second condensing part. An average refractive index of the second condensing part in an optical axis direction is larger than an average refractive index of the first condensing part in an optical axis direction.

An optical module according to another embodiment of the disclosure includes an optical splitting element configured to split a signal beam into a first optical component and a second optical component, a first condensing part configured to condense the first optical component to a first introduction port, and a second condensing part configured to condense the second optical component to a second introduction port. An optical path length of the first optical component from the optical splitting element to the first condensing part is larger than an optical path length of the second optical component from the optical splitting element to the second condensing part. An average refractive index of the second condensing part in an optical axis direction is larger than an average refractive index of the first condensing part in an optical axis direction.

DESCRIPTION OF EMBODIMENTS

Problems to be Solved by Disclosure

Figure 1:
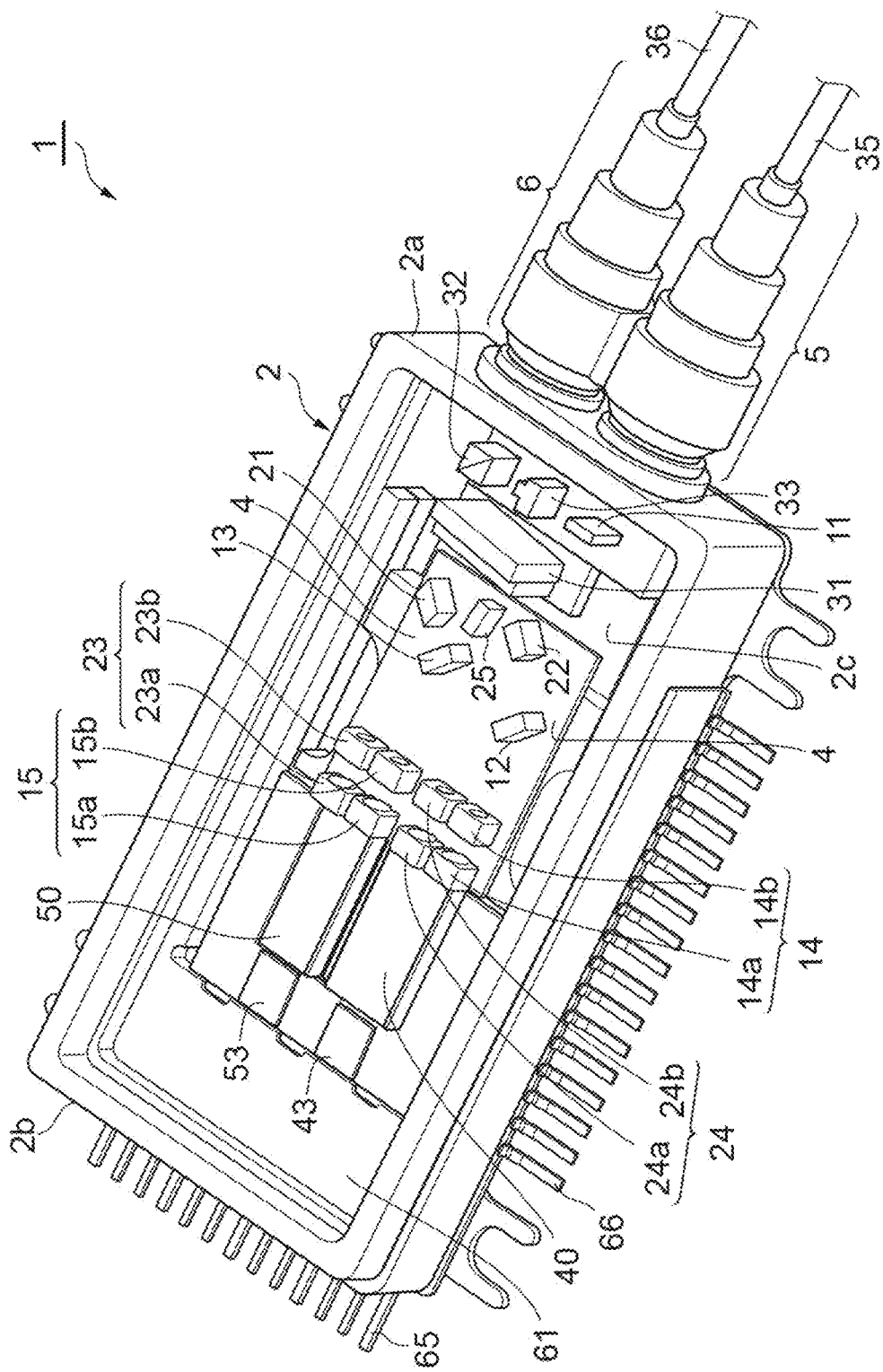
FIG. 1 is a perspective view showing an internal configuration of a coherent receiver that is an optical module according to an embodiment of the disclosure.

In coherent light wave communication, as in the optical receiver described in Patent Literature 1, the signal beam is split into different polarization components, and a plurality of polarization components are received by each of the light-receiving elements. The plurality of split polarization components are adjusted so that phases thereof match each other. This is because it is necessary for the polarization components to be appropriately converted into an electric signal by each of the light-receiving elements. Therefore, in a device such as an optical module, an adjustment component to compensate for (or correct) each of optical lengths may be used between the splitting of the signal beam and each of the light-receiving elements. On the other hand, it is desired to reduce the number of mounted optical components in such an optical module.

Effects of Disclosure

According to an optical module according to the embodiment of the disclosure, the number of components can be reduced while an optical length difference between split polarization components is compensated for.

Description of Embodiments of Disclosure

First, contents of the embodiments of the disclosure will be listed and described. An optical module according to an embodiment includes a first optical splitting element that splits a signal beam including a first polarization component and a second polarization component of which polarization directions are orthogonal to each other into the first polarization component and the second polarization component, a first element having a first introduction port and configured to input the first polarization component from the first introduction port therein, a second element having a second introduction port and configured to input the second polarization component from the second introduction port therein, a first condensing part which is disposed between the first optical splitting element and the first introduction port and condenses the first polarization component toward the first introduction port, and a second condensing part which is disposed between the first optical splitting element and the second introduction port and condenses the second polarization component toward the second introduction port. An optical path length of the first polarization component from the first optical splitting element to the first condensing part is larger than an optical path length of the second polarization component from the first optical splitting element to the second condensing part. An average refractive index of the second condensing part in an optical axis direction is larger than an average refractive index of the first condensing part in an optical axis direction.

In the optical module, the optical path length of the first polarization component until it reaches the first condensing part after the splitting by the first optical splitting element is larger than the optical path length of the second polarization component until it reaches the second condensing part after the splitting by the first optical splitting element. That is, a difference in the optical path length is generated between the first polarization component and the second polarization component. On the other hand, the average refractive index of the second condensing part in the optical axis direction is larger than the average refractive index of the first condensing part in the optical axis direction. The first polarization component passes through the first condensing part and the second polarization component passes through the second condensing part, and thereby the optical length of the first polarization component and the optical length of the second polarization component are substantially the same. Thus, the difference in the optical length between the first polarization component input to the first element and the second polarization component input to the second element is compensated for by the first condensing part and the second condensing part. Therefore, an adjusting component to compensate for the difference in the optical length can be omitted, and the number of components can be reduced.

In the optical module, the first element and the second element may be optical 90-degree hybrid integrated light-receiving elements. The first element may have a third introduction port and may input a first local beam from the third introduction port therein. The second element may have a fourth introduction port and may input a second local beam from the fourth introduction port therein. The optical module may further include a signal beam input port through which a signal beam is input, a local beam input port through which a local beam is input, a second optical splitting element which splits the local beam into a first local beam and a second local beam, a third condensing part which is disposed between the second optical splitting element and the third introduction port and condenses the first local beam toward the third introduction port, and a fourth condensing part which is disposed between the second optical splitting element and the fourth introduction port and condenses the second local beam toward the fourth introduction port. An optical path length of the second local beam from the second optical splitting element to the fourth condensing part may be larger than an optical path length of the first local beam from the second optical splitting element to the third condensing part. An average refractive index of the third condensing part in the optical axis direction may be larger than an average refractive index of the fourth condensing part in the optical axis direction. In this case, a difference in the optical length between the first local beam and the second local beam can be compensated for by the third condensing part and the fourth condensing part. Therefore, the adjusting component to compensate for the difference in the optical length can be omitted, and the number of components can be further reduced.

In the optical module, the average refractive index of the second condensing part in the optical axis direction may be 1.2 times or more and 2.6 times or less the average refractive index of the first condensing part in the optical axis direction. The first condensing part may include one or more first lenses made of any one of glass, quartz, calcium fluoride and magnesium fluoride, and the second condensing part may include at least one second lens made of any one of silicon, zinc selenide and sapphire. In this case, the first condensing part and the second condensing part which can compensate for the difference in the optical length can be easily configured.

The optical module may further include an installation part on which the first condensing part and the second condensing part are installed. The first condensing part may include one or more first lenses made of a material having a first coefficient of linear expansion. The second condensing part may include at least one second lens made of a material having a second coefficient of linear expansion different from the first coefficient of linear expansion. The installation part may include a first installation part having the first lens installed thereon and made of a material having a third coefficient of linear expansion, and a second installation part having the second lens installed thereon and made of a material having a fourth coefficient of linear expansion different from the third coefficient of linear expansion. An absolute value of a difference between the third coefficient of linear expansion and the first coefficient of linear expansion may be smaller than an absolute value of a difference between the fourth coefficient of linear expansion and the first coefficient of linear expansion. An absolute value of a difference between the fourth coefficient of linear expansion and the second coefficient of linear expansion may be smaller than an absolute value of a difference between the third coefficient of linear expansion and the second coefficient of linear expansion. In this case, even when each of the members expands due to an influence of heat or the like, a decrease in reliability can be curbed.

In the optical module, the material of the installation part on which the first lens is installed may be alumina, and the material of the installation part on which the second lens is installed may be aluminum nitride or mullite. For example, the material of the first lens may be glass, the material of the second lens may be silicon, the material of the first installation part may be alumina, and the material of the second installation part may be aluminum nitride or mullite. Alumina has a coefficient of linear expansion close to a coefficient of linear expansion of glass, and aluminum nitride and mullite have a coefficient of linear expansion close to a coefficient of linear expansion of silicon. Therefore, with such a configuration, when each of the members expands due to an influence of heat or the like, a decrease in reliability can be sufficiently curbed.

In the optical module, a thickness of the second condensing part in the optical axis direction may be larger than a thickness of the first condensing part in the optical axis direction. The optical module may further include a first reflecting element which reflects the first polarization component split by the first optical splitting element. The first polarization component split by the first optical splitting element may be condensed to the first condensing part via the first reflecting element. The second polarization component may be directly condensed to the second condensing part from the output side of the first optical splitting element. In the optical module, an optical length from the first optical splitting element to the first introduction port may be substantially the same as an optical length from the first optical splitting element to the second introduction port. In the optical module, a thickness of the fourth condensing part in the optical axis direction may be larger than a thickness of the third condensing part in the optical axis direction. The optical module may further include a second reflecting element which reflects the second local beam split by the second optical splitting element. The second local beam split by the second optical splitting element may be condensed to the fourth condensing part via the second reflecting element. The first local beam may be directly condensed to the third condensing part from the output side of the second optical splitting element. In the optical module, an optical length from the second optical splitting element to the third introduction port may be substantially the same as an optical length from the second optical splitting element to the fourth introduction port.

An optical module according to another embodiment includes an optical splitting element which splits a signal beam into a first optical component and a second optical component, a first condensing part which condenses the first optical component to a first introduction port, and a second condensing part which condenses the second optical component to a second introduction port. An optical path length of the first optical component from the optical splitting element to the first condensing part is larger than an optical path length of the second optical component from the optical splitting element to the second condensing part. An average refractive index of the second condensing part in an optical axis direction is larger than an average refractive index of the first condensing part in an optical axis direction.

In the optical module, the optical path length of the first optical component until it reaches the first condensing part after the splitting by the optical splitting element is larger than the optical path length of the second optical component until it reaches the second condensing part after the splitting by the optical splitting element. That is, a difference in the optical path length is generated between the first optical component and the second optical component. On the other hand, the average refractive index of the second condensing part in the optical axis direction is larger than the average refractive index of the first condensing part in the optical axis direction. The first light component passes through the first condensing part and the second light component passes through the second condensing part, and thereby the optical lengths of the first light component and the second light component are substantially the same. Thus, the difference in the optical length between the first optical component input to the first element and the second optical component input to the second element can be compensated for by the first condensing part and the second condensing part. Accordingly, an adjusting component to compensate for the difference in the optical length can be omitted, and the number of components can be reduced.

In the optical module, a thickness of the second condensing part in the optical axis direction may be larger than a thickness of the first condensing part in the optical axis direction. The optical module may further include a reflecting element which reflects the first optical component split by the optical splitting element. The first optical component split by the optical splitting element may be condensed to the first condensing part via the reflecting element. The second optical component may be directly condensed to the second condensing part from the output side of the optical splitting element. In the optical module, an optical length from the optical splitting element to the first introduction port may be substantially the same as an optical length from the optical splitting element to the second introduction port.

Details of Embodiments of Disclosure

Specific examples of an optical module according to an embodiment of the disclosure will be described below with reference to the drawings. The disclosure is not limited to these examples, but is shown by the scope of the claims and is intended to include all modifications within the meaning and scope equivalent to the scope of the claims. In the following description, the same elements or elements having the same function may be assigned by the same reference numerals, and duplicate description thereof may be omitted.

Figure 2:
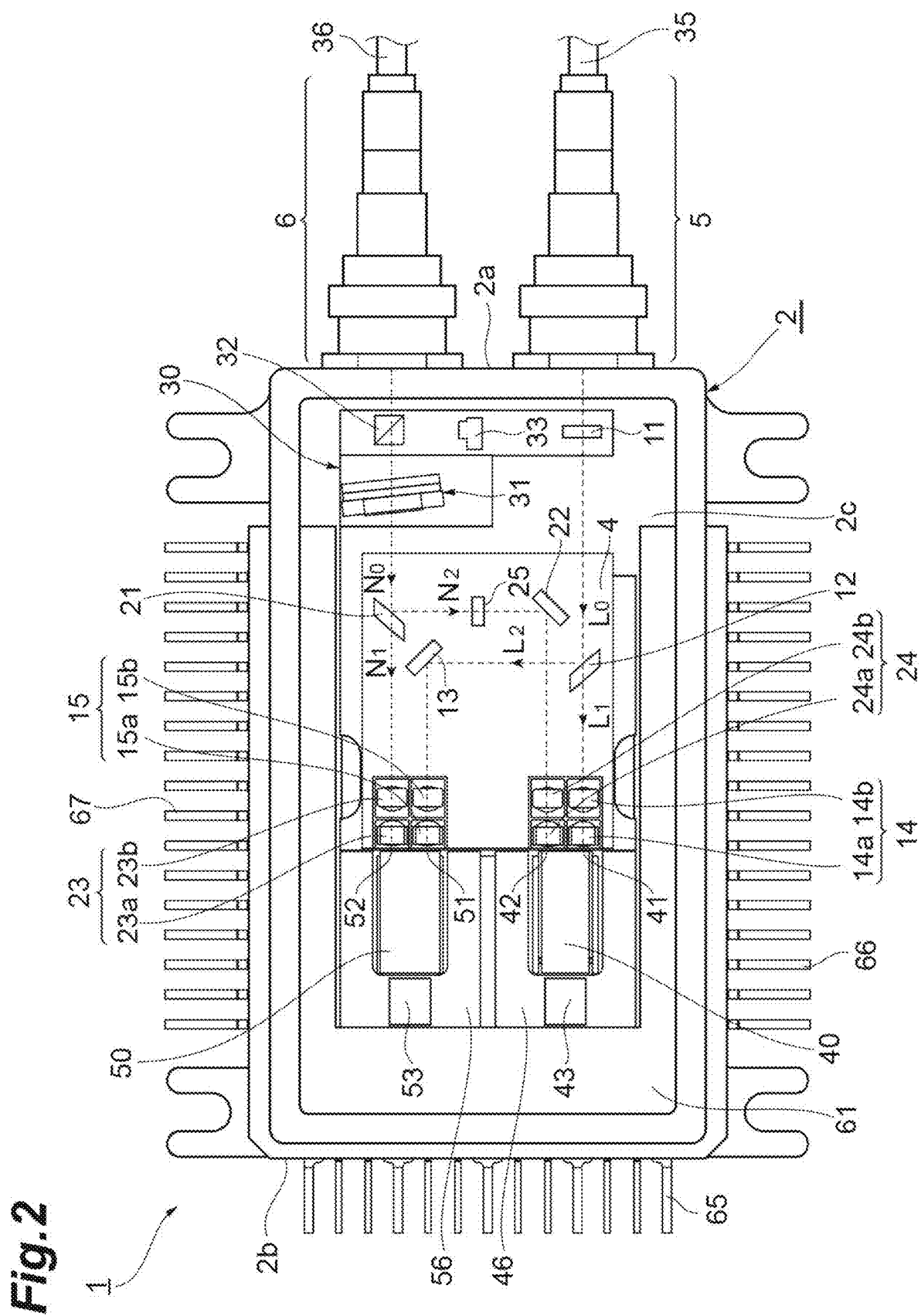
FIG. 2 is a plan view of the coherent receiver shown in FIG. 1.

FIG. 1 is a perspective view showing an internal configuration of a coherent receiver 1 that is an optical module according to an embodiment of the disclosure. FIG. 2 is a plan view of the coherent receiver shown in FIG. 1. The coherent receiver 1 is a device which causes a local beam and a signal beam to interfere with each other and demodulates information contained in the phase-modulated signal beam. The demodulated information is converted into an electric signal and output to the outside of the coherent receiver 1. The coherent receiver 1 includes an optical system for each of the local beam and the signal beam, two multi-mode interference (MMI) units 40 and 50 each including an optical 90-degree hybrid integrated light-receiving element, and a housing 2 to accommodate the optical systems and the MMI units 40 and 50.

The MMI unit 40 is an example of the first element in the embodiment. The MMI unit 50 is an example of the second element in the embodiment. The two MMI units 40 and 50 are semiconductor MMI units and are made of, for example, InP. The MMI unit 40 has a first multi-mode interference part and has a local beam introduction port 41 (a third introduction port) and a signal beam introduction port 42 (a first introduction port). The MMI unit 40 demodulates phase information of the signal beam by causing the signal beam input to the signal beam introduction port 42 to interfere with the local beam input to the local beam introduction port 41. Similarly, the MMI unit 50 has a second multi-mode interference part and has a local beam introduction port 51 (a fourth introduction port) and a signal beam introduction port 52 (a second introduction port). The MMI unit 50 demodulates the phase information of the signal beam by causing the signal beam input to the signal beam introduction port 52 to interfere with the local beam input to the local beam introduction port 51. In this embodiment, the two MMI units 40 and 50 are provided independently of each other, but they may be integrated integrally.

The housing 2 has a front wall 2a. In the following description, the front wall 2a side is referred to as the front side, and the opposite side is referred to as the rear side. However, the front and rear sides are for illustration purposes only and do not limit the scope of the disclosure. A local beam input port 5 and a signal beam input port 6 are fixed to the front wall 2a by, for example, laser welding. A local beam $L_0$ is provided to the local beam input port 5 via a polarization maintaining fiber 35, and a signal beam $N_0$ is provided to the signal beam input port 6 via a single mode fiber 36.

Each of the local beam input port 5 and the signal beam input port 6 has a collimating lens. The local beam input port 5 changes the local beam $L_0$ (which is a divergent beam when emitted from the polarization maintaining fiber 35) emitted from the polarization maintaining fiber 35 into a collimated beam and guides the collimated beam into the housing 2. The signal beam input port 6 changes the signal beam No (which is a divergent beam when emitted from the single mode fiber 36) emitted from the single mode fiber 36 into a collimated beam and guides the collimated beam into the housing 2.

Figure 3:
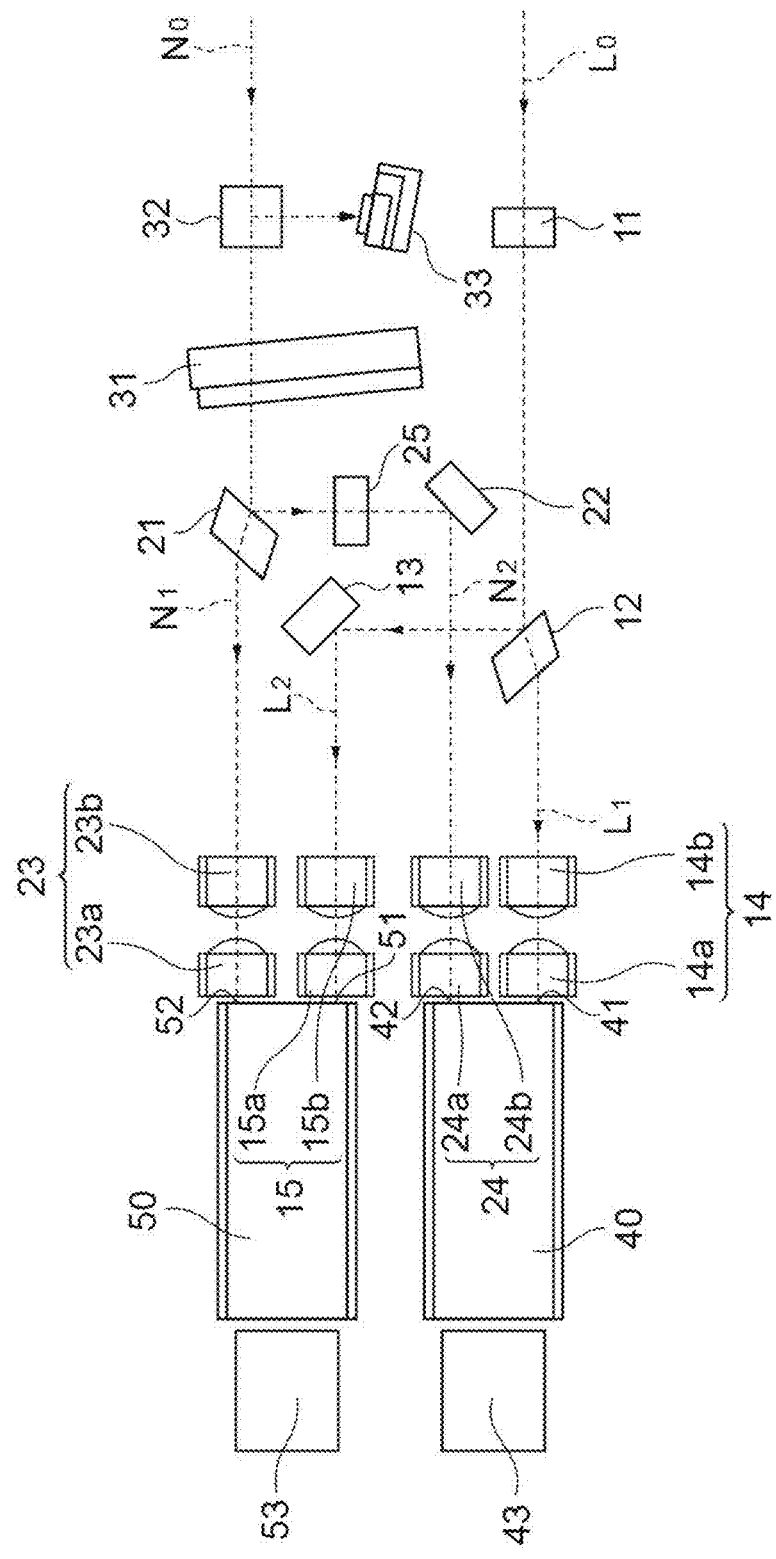
FIG. 3 is a plan view schematically showing connection relationships of optical components inside the coherent receiver.

FIG. 3 is a plan view schematically showing a connection relationship between optical components inside the coherent receiver 1. An optical system for a signal beam includes a polarization beam splitter (PBS) 21 (a first optical splitting element; an optical splitting element), a reflector 22 (a first reflecting element), a lens group 23 (a second condensing part), a lens group 24 (a first condensing part), and a half-wavelength (2l2) plate 25. In this embodiment, the optical system for a signal beam does not include a skew adjusting element to compensate for a difference in an optical length.

The PBS 21 is optically coupled to the signal beam input port 6 and splits the signal beam No provided from the single mode fiber 36 via the signal beam input port 6. A splitting ratio is, for example, 50:50. The signal beam No provided by the single mode fiber 36 includes a first polarization component and a second polarization component as two polarization components of which polarization directions are orthogonal to each other. The first polarization component is an example of a first beam component, and the second polarization component is an example of a second beam component. The PBS 21 separates the two polarization components of the signal beam No from each other. The first polarization component is, for example, a polarization component of the signal beam No perpendicular to a bottom surface 2c of the housing 2. The second polarization component is, for example, a polarization component of the signal beam No parallel to the bottom surface 2c of the housing 2. The PBS 21 transmits the second polarization component and forms a signal beam $N_1$, and reflects the first polarization component and forms a signal beam $N_2$.

The signal beam $N_1$ transmitted through the PBS 21 goes straight toward the MMI unit 50. Then, the signal beam $N_1$ is optically coupled to the signal beam introduction port 52 of the MMI unit 50 via the lens group 23. The polarization direction of the signal beam $N_2$ reflected by the PBS 21 is rotated 90° while the signal beam $N_2$ passes through the λ/2 plate 25. The polarizations of the signal beams $N_1$ and $N_2$ immediately after splitting are orthogonal to each other. When the signal beam $N_2$ passes through the λ/2 plate 25, the polarization direction of the signal beam $N_2$ is rotated 90°, and a signal beam like the signal beam $N_1$ is formed. Then, an optical axis of the signal beam $N_2$ is changed by a reflector 22 by 90°, and the signal beam $N_2$ is optically coupled to the signal beam introduction port 42 of the MMI unit 40 via the lens group 24.

The lens group 23 is disposed on an optical path of the signal beam $N_1$ between the PBS 21 and the MMI unit 50. The lens group 23 condenses the signal beam $N_1$ split by the PBS 21 toward the signal beam introduction port 52 of the MMI unit 50. The lens group 24 is disposed between the PBS 21 and the signal beam introduction port 42. Specifically, the lens group 24 is disposed on an optical path of the signal beam $N_2$ between the reflector 22 and the MMI unit 40. The lens group 24 condenses the signal beam $N_2$ split by the PBS 21 and reflected by the reflector 22 toward the signal beam introduction port 42 of the MMI unit 40. The signal beam $N_2$ split by the PBS 21 is condensed on the lens group 24 via the reflector 22, and the signal beam $N_1$ is directly condensed on the lens group 23 from the output side of the PBS 21. An optical path length of the signal beam $N_2$ until it reaches the lens group 24 after the splitting by the PBS 21 is larger than an optical path length of the signal beam $N_1$ until it reaches the lens group 23 after the splitting by the PBS 21. That is, the sum of the optical path length of the signal beam $N_2$ from the PBS 21 to the reflector 22 and the optical path length of the signal beam $N_2$ from the reflector 22 to the lens group 23 is larger than the optical path length of the signal beam $N_1$ from the PBS 21 to the lens group 23. A difference in the optical path length between the signal beams $N_1$ and $N_2$ corresponds to the optical path length from the PBS 21 to the reflector 22, and is, for example, 2 mm Here, the optical path length indicates a distance. For example, the optical path length of the signal beam $N_2$ until it reaches the lens group 24 after the splitting by the PBS 21 indicates a distance (a length) until it reaches the lens group 24 after the splitting by the PBS 21.

The lens group 23 includes a lens 23a disposed relatively close to the MMI unit 50 and a lens 23b disposed relatively far from the MMI unit 50. The lens group 24 includes a lens 24a disposed relatively close to the MMI unit 40 and a lens 24b disposed relatively far from the MMI unit 40. As described above, optical coupling efficiency of the signal beams $N_1$ and $N_2$ with respect to the small signal beam introduction ports 52 and 42 of the MMI units 50 and 40 can be increased by combining the lenses 23a and 24a and the lenses 23b and 24b to form a condensing lens.

The lens groups 23 and 24 compensate for the difference in the optical length between the two signal beams $N_1$ and $N_2$ from the PBS 21 to the respective signal beam introduction ports 52 and 42. Specifically, the lens groups 23 and 24 compensate for the difference in the optical length between the signal beams $N_1$ and $N_2$ generated until they reach the lens groups 23 and 24 after the splitting, in other words, a time difference between the signal beams $N_1$ and $N_2$ until they reach the signal beam introduction ports 52 and 42.

Therefore, a refractive index of the lens group 23 in an optical axis direction is larger than an average refractive index of the lens group 24 in the optical axis direction. For example, the average refractive index of the lens group 23 in the optical axis direction may be 1.2 times or more and 2.6 times or less the average refractive index of the lens group 24 in the optical axis direction. A thickness of the lens group 23 in the optical axis direction is larger than a thickness of the lens group 24 in the optical axis direction.

The lens 24a is an example of the first lens in the embodiment. The lens 23a is an example of the second lens in the embodiment. The refractive index of the lens 23a is larger than the refractive index of the lens 24a. A material of the lens 24a is glass ($SiO_2$), and the refractive index of the lens 24a is 1.5 or more and 1.8 or less. A material of the lens 23a is silicon (Si), and the refractive index of the lens 23a is 3.5. The material of the lens 23a may be any material having a refractive index larger than that of the material of the lens 24a and may be zinc selenide, sapphire, or the like. The material of the lens 24a may be quartz, calcium fluoride, magnesium fluoride or the like. In this embodiment, materials of the lenses 23b and 24b are the same as the material of the lens 24a (for example, glass), and the lenses 23b and 24b have the same refractive index as that of the lens 24a. In the lens group 23, the material of the lens 23a may be glass and the material of the lens 23b may be silicon.

Figure 4A:
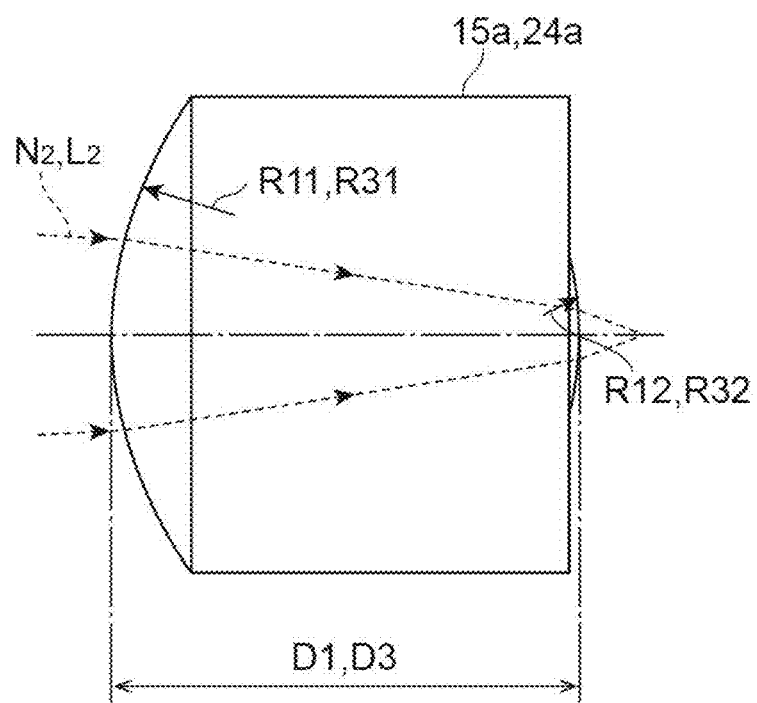
FIG. 4A is a plan view of a lens shown in FIG. 2.
Figure 4B:
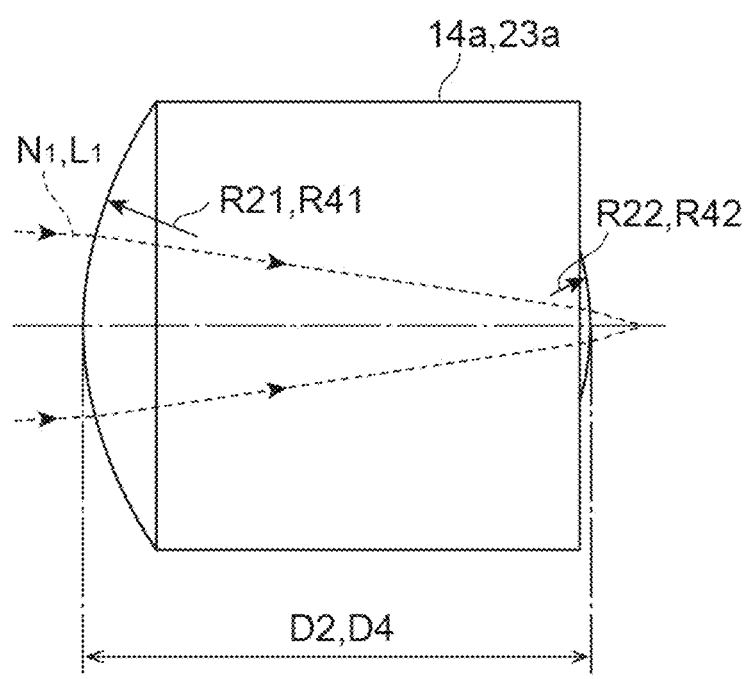
FIG. 4B is a plan view of another lens shown in FIG. 2.

As shown in FIGS. 4A and 4B, a thickness D1 of the lens 24a in the optical axis direction is smaller than a thickness D2 of the lens 23a in the optical axis direction. Thus, the optical lengths (the distances traveled by the beam) from the PBS 21 to the signal beam introduction ports 42 and 52 are substantially the same as each other. As an example, the thickness D1 is 0.78 mm, and the thickness D2 is 0.96 mm. The optical length is the distance traveled by the beam and is represented by "(physical) length multiplied by refractive index". In this embodiment, since the respective optical path lengths from the PBS 21 to the lenses 23a and 24a are different from each other, the respective optical lengths from the PBS 21 to the lenses 23a and 24a are different from each other. Thus, the respective optical lengths from the PBS 21 to the signal beam introduction ports 42 and 52 are compensated for (so that the optical lengths are the same) using the lenses 24a and 23a.

Shapes of cross sections of the lenses 23a and 24a passing through the optical axis are different from each other. In this embodiment, a surface of the lens 24a on the incident side is a spherical surface having a radius R11, and a surface of the lens 23a on the incident side is a spherical surface having a radius R21 larger than the radius R11. A surface of the lens 24a on the emitting side is a spherical surface having a radius R12, and a surface of the lens 23a on the emitting side is a spherical surface having a radius R22 smaller than the radius R12. In this embodiment, the radii R11, R12, R21, and R22 are set so that the optical coupling efficiencies of the signal beams $N_1$ and $N_2$ with respect to the signal beam introduction ports 52 and 42 are substantially the same. As one example, the radius R11 is 0.565 mm and the radius R21 is 0.596 mm. The radius R12 is 0.404 mm and the radius R22 is 0.401 mm Shapes of the surfaces of the lenses 23a and 24a orthogonal to the optical axis direction may be the same.

The optical system for a local beam guides the local beam provided from the local beam input port 5 to the local beam introduction ports 41 and 51 of the MMI units 40 and 50. The optical system for a local beam includes a polarizer 11, a beam splitter (BS) 12 (a second optical splitting element), a reflector 13 (a second reflecting element), a lens group 14 (a third condensing part), a lens group 15 (a fourth condensing part). In this embodiment, the optical system for a local beam does not include a skew adjusting element to compensate for the difference in the optical length.

The polarizer 11 is optically coupled to the local beam input port 5 and adjusts a polarization direction of the local beam $L_0$ provided from the local beam input port 5. A light source of the local beam $L_0$ outputs an extremely flat elliptically polarized beam. Even when the light source of local beam $L_0$ outputs a linearly polarized beam, it does not mean that the local beam $L_0$ input from the local beam input port 5 has a linearly polarized beam in a desired direction according to mounting accuracy of the optical components inserted in the optical path from the light source to the coherent receiver 1, or the like. The polarizer 11 converts the local beam $L_0$ input from the local beam input port 5 into a linearly polarized beam having a desired polarization direction (for example, a direction parallel to the bottom surface 2c of the housing 2).

The BS 12 bifurcates the local beam $L_0$ output from the polarizer 11 into a local beam $L_1$ (a first local beam) and a local beam $L_2$ (a second local beam). A splitting ratio is 50:50. One split local beam $L_1$ goes straight on the BS 12 toward the MMI unit 40. Then, the local beam $L_1$ is optically coupled to the local beam introduction port 41 of the MMI unit 40 via the lens group 14. The optical axis of the other local beam $L_2$ is changed by 90° by the BS 12, and further, the optical axis thereof is changed by 90° again by the reflector 13 toward the MMI unit 50. Then, the local beam $L_2$ is optically coupled to the local beam introduction port 51 of the MMI unit 50 via the lens group 15.

The lens group 14 is disposed on the optical path of the local beam $L_1$ between the BS 12 and the MMI unit 40. The lens group 14 condenses the local beam $L_1$ split by the BS 12 toward the local beam introduction port 41 of the MMI unit 40. The lens group 15 is disposed between the BS 12 and the local beam introduction port 51. Specifically, the lens group 15 is disposed on the optical path of the local beam $L_2$ between the reflector 13 and the MMI unit 50. The lens group 15 condenses the local beam $L_2$ split by the BS 12 and reflected by the reflector 13 toward the local beam introduction port 51 of the MMI unit 50. The local beam $L_2$ split by the BS 12 is condensed to the lens group 15 via the reflector 13, and the local beam $L_1$ is directly condensed to the lens group 14 from the output side of the BS 12. An optical path length of the local beam $L_2$ until it reaches the lens group 15 after the splitting by the BS 12 is larger than an optical path length of the local beam $L_1$ until it reaches the lens group 14 after the splitting by the BS 12. That is, the sum of the optical path length of the local beam $L_2$ from the BS 12 to the reflector 13 and the optical path length of the local beam $L_2$ from the BS 12 to the lens group 15 is larger than the optical path length of the local beam $L_1$ from the BS 12 to the lens group 14. A difference in the optical path length between the local beams $L_1$ and $L_2$ corresponds to the optical path length from the BS 12 to the reflector 13, and is, for example, 2 mm.

The optical path length of the signal beam $N_2$ until it reaches the lens group 24 after the inputting through the signal beam input port 6 is larger than the optical path length of the local beam $L_1$ until it reaches the lens group 14 after the inputting through the local beam input port 5 by the same length as the difference in the optical path length between the signal beams $N_1$ and $N_2$. On the other hand, the optical path length of the signal beam $N_1$ until it reaches the lens group 23 after the inputting through the signal beam input port 6 is smaller than the optical path length of the local beam $L_2$ until it reaches the lens group 15 after the inputting through the local beam input port 5 by the same length as the difference in the optical path length between the local beam $L_1$ and $L_2$.

The lens group 14 includes a lens 14a disposed relatively close to the MMI unit 40 and a lens 14b disposed relatively away from the MMI unit 40. The lens group 15 includes a lens 15a disposed relatively close to the MMI unit 50 and a lens 15b disposed relatively away from the MMI unit 50. In this way, it is possible to increase the optical coupling efficiency of the local beams $L_1$ and $L_2$ with respect to the small local beam introduction ports 41 and 51 of the MMI units 40 and 50 by combining the lenses 14a and 15a and the lenses 14b and 15b to form a condensing lens.

The lens groups 14 and 15 compensate for the difference in the optical length between the two local beams $L_1$ and $L_2$ from the BS 12 to the respective local beam introduction ports 41 and 51. Specifically, the lens groups 14 and 15 compensate for the difference in the optical length between the local beams $L_1$ and $L_2$ generated until they reach the lens groups 14 and 15 after the splitting, in other words, a time difference between the local beams $L_1$ and $L_2$ until they reach the respective local beam introduction ports 41 and 51. Therefore, an average refractive index of the lens group 14 in the optical axis direction is larger than an average refractive index of the lens group 15 in the optical axis direction. For example, the average refractive index of the lens group 14 in the optical axis direction may be 1.2 times or more and 2.6 times or less the average refractive index of the lens group 15 in the optical axis direction. A thickness of the lens group 14 in the optical axis direction is larger than a thickness of the lens group 15 in the optical axis direction.

The refractive index of the lens 15a is smaller than that of the lens 14a. For example, a material of the lens 14a is the same as that of the lens 23a (for example, silicon), and the refractive index of the lens 14a is the same as that of the lens 23a (for example, 3.5). A material of the lens 15a is the same as that of the lens 24a (for example, glass), and the refractive index of the lens 15a is the same as that of the lens 24a (for example, 1.5 or more and 1.8 or less). In other words, the refractive index of the lens 14a is larger than the refractive index of the lens 24a, and the refractive index of the lens 23a is larger than the refractive index of the lens 15a. The material of the lens 14a may be any material having a refractive index larger than that of the material of the lens 15a, and may not be the same as the material of the lens 23a. The material of the lens 15a may not be the same as the material of the lens 24a. In this embodiment, the materials of the lenses 14b and 15b is the same as the material of the lens 15a (for example, glass), and the lenses 14b and 15b have the same refractive index as that of the lens 15a. In the lens group 14, the material of the lens 14a may be glass, and the material of the lens 14b may be silicon.

As shown in FIGS. 4A and 4B, a thickness D3 of the lens 15a in the optical axis direction is smaller than a thickness D4 of the lens 14a in the optical axis direction. Thus, the optical lengths (the distances traveled by the beam) from the BS 12 to the respective local beam introduction ports 41 and 51 are substantially the same. As one example, the thickness D3 is the same as the thickness D1 (that is, 0.78 mm), and the thickness D4 is the same as the thickness D2 (that is, 0.96 mm) In other words, the thickness D2 is larger than the thickness D3, and the thickness D4 is larger than the thickness D1.

With such a configuration, in this embodiment, the refractive index of the lens group 23 in the optical axis direction is larger than the refractive index of the lens group 15 in the optical axis direction, and the refractive index of the lens group 14 in the optical axis direction is larger than the refractive index of the lens group 24 in the optical axis direction. The thickness of the lens group 23 in the optical axis direction is larger than the thickness of the lens group 15 in the optical axis direction, and the thickness of the lens group 14 in the optical axis direction is larger than the thickness of the lens group 24 in the optical axis direction.

Thus, the lens groups 23 and 15 compensate for the difference in between the optical length of the signal beam $N_1$ until it reaches the signal beam introduction port 52 after the inputting, and the optical length of the local beam $L_2$ until it reaches the local beam introduction port 51 after the inputting. Similarly, the lens groups 24 and 14 compensate for the difference in between the optical length of the signal beam $N_2$ until it reaches the signal beam introduction port 42 after the inputting, and the optical length of the local beam $L_1$ until it reaches the local beam introduction port 41 after the inputting. This is because, as shown in FIG. 4A, the optical length can be made longer than that of a conventional glass lens, by using a lens made of silicon and having a high refractive index. The distance traveled by the beam (optical length) is not a physical length, but is a "(physical) length multiplied by refractive index". Therefore, the beam passes through the lens made of silicon which has a higher refractive index than that of glass, and thus travels a distance equal to or longer than the physical length. In other words, the beam is delayed (the distance traveled by the beam becomes longer) in the lens made of silicon.

Shapes of cross sections of the lenses 14a and 15a passing through the optical axis are different from each other. In the embodiment, a surface of the lens 15a on the incident side is a spherical surface having a radius R31, and a surface of the lens 14a on the incident side is a spherical surface having a radius R41 larger than the radius R31. A surface of the lens 15a on the emitting side is a spherical surface with a radius R32, and a surface of the lens 14a on the emitting side is a spherical surface with a radius R42 smaller than the radius R32. In this embodiment, the radii R31, R32, R41, and R42 are set so that the optical coupling efficiencies of the local beams $L_1$ and $L_2$ with respect to the local beam introduction ports 41 and 51 are substantially the same. As one example, the radius R31 is the same as the radius R11 (that is, 0.565 mm), and the radius R41 is the same as the radius R21 (that is, 0.596 mm) The radius R32 is the same as the radius R12 (that is, 0.404 mm), and the radius R42 is the same as the radius R22 (that is, 0.401 mm) Shapes of the surfaces of the lenses 14a and 15a orthogonal to the optical axis direction may be the same.

Returning from FIG. 1 to FIG. 3, the MMI unit 40 includes a multi-mode interference waveguide (an MMI waveguide) and a photodiode (PD) optically coupled to the waveguide. The MMI waveguide is, for example, a waveguide formed on an InP substrate, causes the local beam $L_1$ input to the local beam introduction port 41 and the signal beam $N_2$ input to the signal beam introduction port 42 to interfere with each other, and separately demodulates information contained in the signal beam $N_2$ into a phase component which matches a phase of the local beam $L_1$ and a phase component which is different from the phase of the local beam $L_1$ by 90°. That is, the MMI unit 40 demodulates two independent pieces of information about the signal beam $N_2$. Similarly, the MMI unit 50 includes an MMI waveguide and a PD optically coupled to the waveguide. The MMI waveguide is a waveguide formed on an InP substrate, causes the local beam $L_2$ input to the local beam introduction port 51 and the signal beam $N_1$ input to the signal beam introduction port 52 to interfere with each other, and demodulates two independent pieces of information. Although not shown, the optical module of FIG. 1 can also use an optical semiconductor device in which the MMI unit 40 and the MMI unit 50 are integrated into one.

Figure 5:
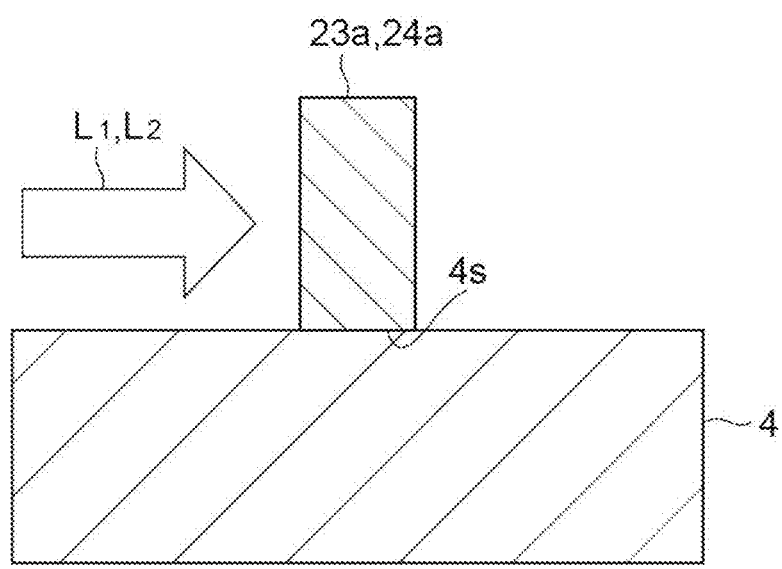
FIG. 5 is a cross-sectional view of each of the lenses and a base shown in FIG. 2.

As shown in FIGS. 1 and 2, the optical systems and the MMI units 40 and 50 are mounted on the bottom surface 2c of the housing 2 via a base 4 (an installation part). Circuit boards 46 and 56 on which a circuit to process demodulated information is mounted are mounted on the bottom surface 2c. The lenses of the lens groups 14, 15, 23, and 24 described above are mounted on the base 4. As shown in FIG. 5, a ground surface 4s of each of the lenses with respect to the base 4 is adhered and fixed to the base 4. The base 4 is made of a material having an intermediate coefficient of linear expansion of those of a plurality of materials used for the lenses. Here, in this embodiment, a coefficient of linear expansion of glass which is the material of the lenses 14b, 15a, 15b, 23b, 24a, 24b is $6.2 \times 10^{-6}$/K or more and $8.2 \times 10^{-6}$/K or less (for example, $7.2 \times 10^{-6}$/K), and a coefficient of linear expansion of silicon which is the material of the lenses 14a and 23a is $3.4 \times 10^{-6}$/K or more and $4.0 \times 10^{-6}$/K or less (for example, $3.8 \times 10^{-6}$/K). In the embodiment, the base 4 is made of an insulating material such as aluminum nitride (AlN) having a coefficient of linear expansion of $4.5 \times 10^{-6}$/K or more and $4.6 \times 10^{-6}$/K or less (for example, $4.5 \times 10^{-6}$/K). Mullite ($Al_6O_{13}Si_2$) having a coefficient of linear expansion of $5.1 \times 10^{-6}$/K or more and $5.3 \times 10^{-6}$/K (for example, $5.3 \times 10^{-6}$/K) may be used as the material of the base 4. Among the materials, aluminum nitride may be used from the viewpoint of curbing an increase in manufacturing cost (for example, material cost, processing cost, and the like).

The housing 2 has a rear wall 2b on the side opposite to the front wall 2a. The housing 2 has a feedthrough 61 continuously provided from two side walls connecting the front wall 2a and the rear wall 2b to the rear wall 2b. A plurality of signal output terminals 65 are provided in the feedthrough 61 of the rear wall 2b, and the four independent pieces of information demodulated by the MMI units 40 and 50 are signal-processed in integrated circuits 43 and 53, and are then guided to the outside of the coherent receiver 1 via the signal output terminals 65. An amplifier is mounted on each of the integrated circuits 43 and 53. Other terminals 66 and 67 are provided on the two side walls. The terminals 66 and 67 provide DC or low frequency signals such as a signal for driving the MMI units 40 and 50 and a signal for driving each of the optical components to the inside the housing 2. The integrated circuits 43 and 53 are respectively mounted on the circuit boards 46 and 56 surrounding the MMI units 40 and 50. Further, resistance elements, capacitive elements, and, if necessary, a DC/DC converter are mounted on the circuit boards 46 and 56.

The coherent receiver 1 further includes a variable optical attenuator (VOA) 31, a BS 32, and a monitor PD 33. The VOA 31 and the BS 32 are disposed on the optical path of the signal beam No between the PBS 21 and the signal beam input port 6. The BS 32 separates a part of the signal beam No input from the signal beam input port 6. The separated part of the signal beam No is input to the monitor PD 33. The monitor PD33 generates an electric signal according to an intensity of the part of the signal beam No.

The VOA 31 attenuates the signal beam No which has passed through the BS 32, if necessary. A degree of attenuation is controlled by an electrical signal from the outside of the coherent receiver 1. For example, when an over-input state is detected based on the electrical signal from the above-described monitor PD 33, the degree of attenuation of the VOA 31 is increased, and the intensities of the signal beams $N_1$ and $N_2$ toward the MMI units 40 and 50 are reduced. The BS 32, the VOA 31, and the monitor PD 33 are fixed on a VOA carrier 30 mounted on the bottom surface 2c of the housing 2. The VOA carrier 30 mounts these optical components on two upper and lower surfaces thereof forming a step. Specifically, the BS 32 and the monitor PD 33 are mounted on one surface, and the VOA 31 is mounted on the other surface.

An operation and effect of the above-described coherent receiver 1 will be described. In the coherent receiver 1 according to this embodiment, the optical path length of the signal beam $N_2$ until it reaches the lens group 24 (specifically, the lens 24b) after the splitting by the PBS 21 is larger than the optical path length of the signal beam $N_1$ until it reaches the lens group 23 (specifically, the lens 23a) after the splitting by the PBS 21. That is, a difference in the optical path length between the signal beams $N_1$ and $N_2$ is generated.

Figure 13A:
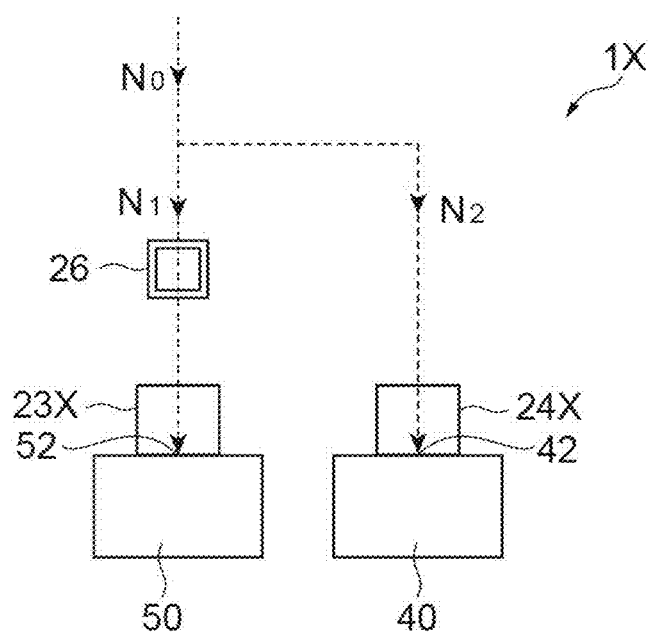
FIG. 13A is a plan view schematically showing a coherent receiver according to a comparative example.
Figure 13B:
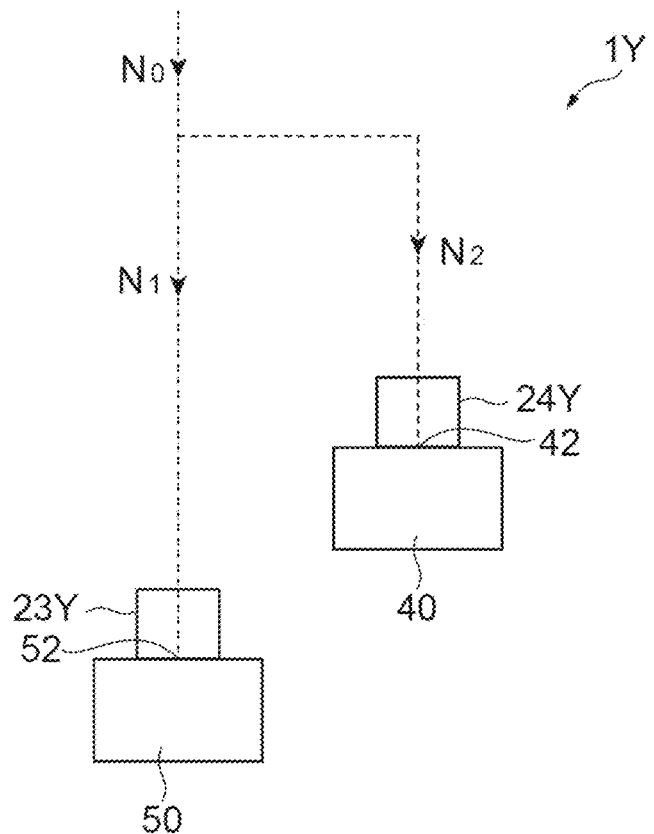
FIG. 13B is a plan view schematically showing a coherent receiver according to another comparative example.

Here, coherent receivers 1X and 1Y according to comparative examples will be described with reference to FIGS. 13A and 13B. FIG. 13A is a plan view schematically showing the coherent receiver 1X. FIG. 13B is a plan view schematically showing the coherent receiver 1Y. The optical systems for a signal beam in the coherent receivers 1X and 1Y include lenses 23X and 23Y in place of the lens 23a, and lenses 24X and 24Y in place of the lens 24a. Materials of the lenses 23X and 24X are the same each other (for example, glass). In the coherent receivers 1X and 1Y, the signal beam $N_1$ is condensed to the signal beam introduction port 52 of the MMI unit 50 by the lenses 23X and 23Y, and the signal beam $N_2$ is condensed to the signal beam introduction port 42 of the MMI unit 40 by the lenses 24X and 24Y. In FIGS. 13A and 13B, the optical system for a local beam and other optical components are not shown.

In the coherent receiver 1X, as in the coherent receiver 1, the optical path length of the signal beam $N_2$ until it reaches the lens 24X after the splitting is larger than the optical path length of the signal beam $N_1$ until it reaches the lens 23X after the splitting. That is, a difference in the optical path length between the signal beams $N_1$ and $N_2$ is generated. Therefore, it is necessary to compensate for the difference in the optical length due to the difference in the optical path length.

The coherent receiver 1X further includes a skew adjusting element 26 to compensate for the above-described difference in the optical length. Thus, the number of components is large, and this causes an increase in a size of the device. The coherent receiver 1Y does not include the skew adjusting element 26. In the coherent receiver 1Y, the signal beam introduction port 52 of the MMI unit 50 is disposed behind the signal beam introduction port 42 of the MMI unit 40 to compensate for the difference in the optical length.

On the other hand, in the coherent receiver 1, the average refractive index of the lens group 23 in the optical axis direction is larger than the average refractive index of the lens group 24 in the optical axis direction. Thus, when the signal beam $N_2$ passes through the lens group 24 and the signal beam $N_1$ passes through the lens group 23, the optical lengths of the signal beams $N_1$ and $N_2$ become substantially the same as each other. Therefore, the difference in the optical length between the signal beam $N_2$ input to the MMI unit 40 and the signal beam $N_1$ input to the MMI unit 50 can be compensated for by the lens groups 23 and 24. Therefore, an adjusting component to compensate for the difference in the optical length can be omitted, and the number of components can be reduced. Since the optical system for a signal beam in this embodiment does not include the adjusting component (for example, the skew adjusting element 26) to compensate for the above-described difference in the optical length, the device can be miniaturized.

In the coherent receiver 1, the MMI units 40 and 50 are optical 90-degree hybrid integrated light receiving elements. The MMI unit 40 has the local beam introduction port 41 and inputs the local beam $L_1$ from the local beam introduction port 41, and the MMI unit 50 has a local beam introduction port 51 and inputs the local beam $L_2$ from the local beam introduction port 51. The coherent receiver 1 further includes the signal beam input port 6 through which the signal beam $N_0$ is input, the local beam input port 5 through which the local beam $L_0$ is input, the BS 12 which splits the local beam $L_0$ into the local beams $L_1$ and $L_2$, and the lens group 14 which is disposed between the BS 12 and the local beam introduction port 41 and condenses the first local beam toward the local beam introduction port 41, and the lens group 15 which is disposed between the BS 12 and the local beam introduction port 51 and condenses the local beam $L_2$ toward the local beam introduction port 51. The optical path length of the local beam $L_2$ from the BS 12 to the lens group 15 is larger than the optical path length of the local beam $L_1$ from the BS 12 to the lens group 14. The average refractive index of the lens group 14 in the optical axis direction is larger than the average refractive index of the lens group 15 in the optical axis direction. With such as configuration, the difference in the optical length between the local beams $L_1$ and $L_2$ can be compensated for by the lens groups 14 and 15. Therefore, the adjusting component to compensate for the difference in the optical length can be omitted, and the number of components can be further reduced.

In the coherent receiver 1, the refractive index of the lens group 14 is larger than the refractive index of the lens group 24 in the optical axis direction. The optical path length of the signal beam $N_2$ until it reaches the lens group 24 after the inputting through the signal beam input port 6 is larger than the optical path length of the local beam $L_1$ until it reaches the lens group 14 after the inputting through the local beam input port 5. The refractive index of the lens group 14 in the optical axis direction is larger than the refractive index of the lens group 24 in the optical axis direction. With such a configuration, the difference in the optical length between the signal beam $N_2$ and the local beam $L_1$ can be compensated for by the lens groups 14 and 24. Therefore, the signal beam $N_2$ and the local beam $L_1$ input to the MMI unit 40 can be brought into a state suitable for optical coupling while the adjusting component to compensate for the difference in the optical length is omitted.

In the coherent receiver 1, the lens group 24 includes one or more lenses 24a made of glass, and the lens group 23 includes at least one lens 23a made of silicon. Silicon has a particularly large refractive index with respect to glass. Therefore, with such a configuration, the lens groups 23 and 24 which can compensate for the difference in the optical length while an increase in the difference between the thickness D2 of the lens 23a and the thickness D1 of the lens 24a is curbed can be easily configured.

Specifically, when the skew adjusting element to compensate for the difference in the optical length between the signal beams $N_1$ and $N_2$ is omitted and the difference in the optical length is compensated for by the lens groups 23 and 24, it is necessary to make the thickness D2 larger than the thickness D1. For example, in the embodiment, in order to compensate for a difference in the optical length of 2 mm, the thickness D2 of the lens 23a (the lens made of silicon) is made larger by 0.18 mm than the thickness D1 of the lens 24a (the lens made of glass).

On the other hand, in order to secure the sufficient optical coupling efficiency at the signal beam introduction port 52 of the MMI unit 50, the lens 23a is also required to have a function of condensing the signal beam $N_1$ having the same illuminance as that of the signal beam $N_2$, which is condensed to the signal beam introduction port 42 by the lens 24a, to the signal beam introduction port 52. However, when the thickness D2 is increased, and the shape of the cross section passing through the optical axis of the lens 23a is made the same as the shape of the cross section passing through the optical axis of the lens 24a, it becomes difficult to condense the signal beam $N_1$ having the same illuminance as that of the signal beam $N_2$, which is condensed to the signal beam introduction port 52 by the lens 24a, to the signal beam introduction port 42, such as a focal point of the signal beam $N_1$ being located inside the lens 23a (refer to FIG. 10). Accordingly, it is also conceivable that the optical coupling efficiency between the lens 23c and the MMI unit 40 may be reduced.

On the other hand, in the coherent receiver 1, the surface of the lens 24a on the incident side is a spherical surface having a radius R11, and the surface of the lens 23a on the incident side is a spherical surface having a radius R21 larger than the radius R11. The surface of the lens 24a on the emitting side is a spherical surface having a radius R12, and the surface of the lens 23a on the emitting side is a spherical surface having a radius R22 smaller than the radius R12. For example, when the difference in the optical length due to the difference in the optical path length of 2 mm is compensated for by the lenses 23a and 24a, the radius R11 is 0.565 mm, and the radius R21 is 0.596 mm. The radius R12 is 0.404 mm, and the radius R22 is 0.401 mm.

Figure 6:
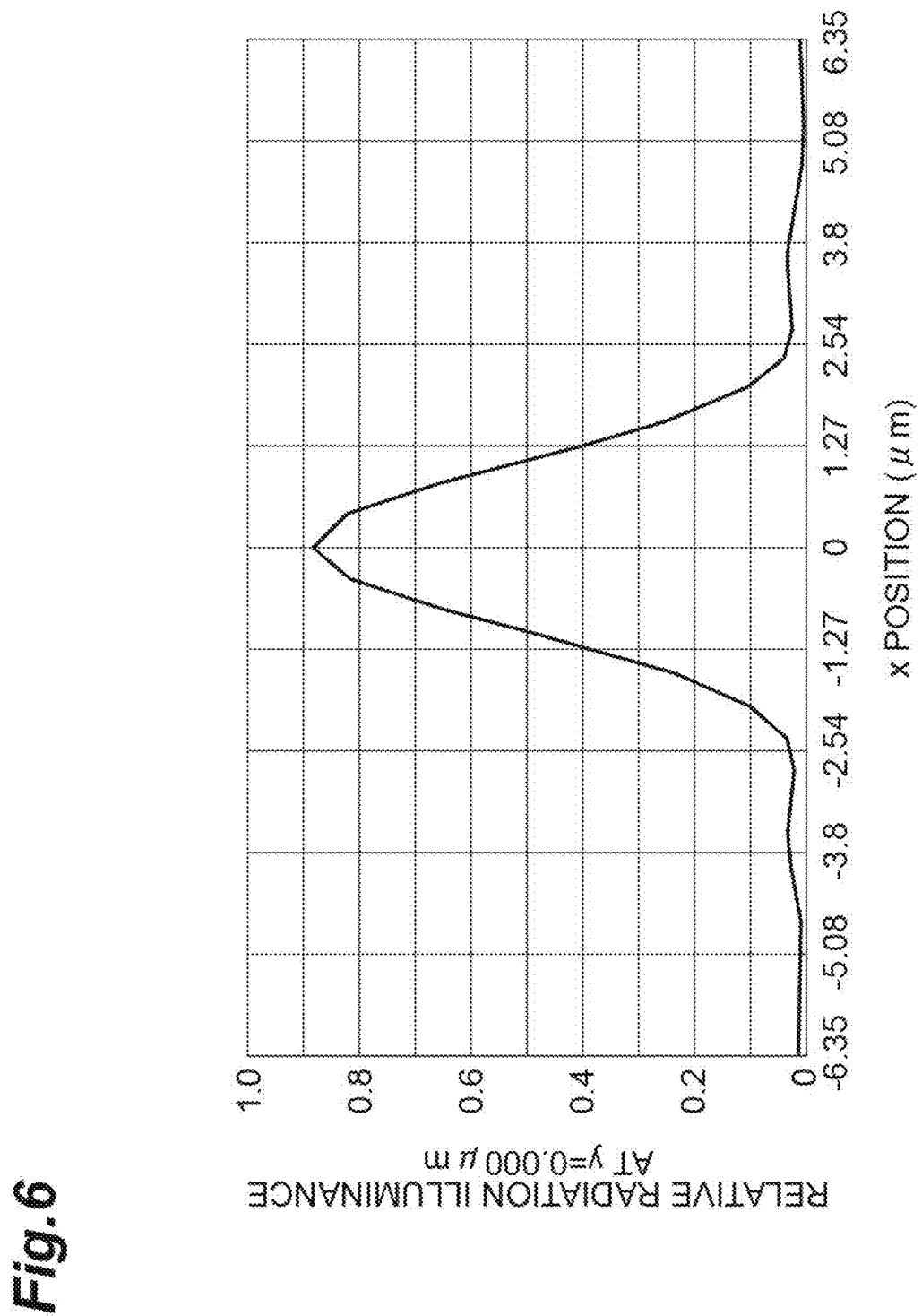
FIG. 6 is a graph obtained by actually measuring a relationship between a position and illuminance of a beam condensed to the lens shown in FIG. 4A.
Figure 7:
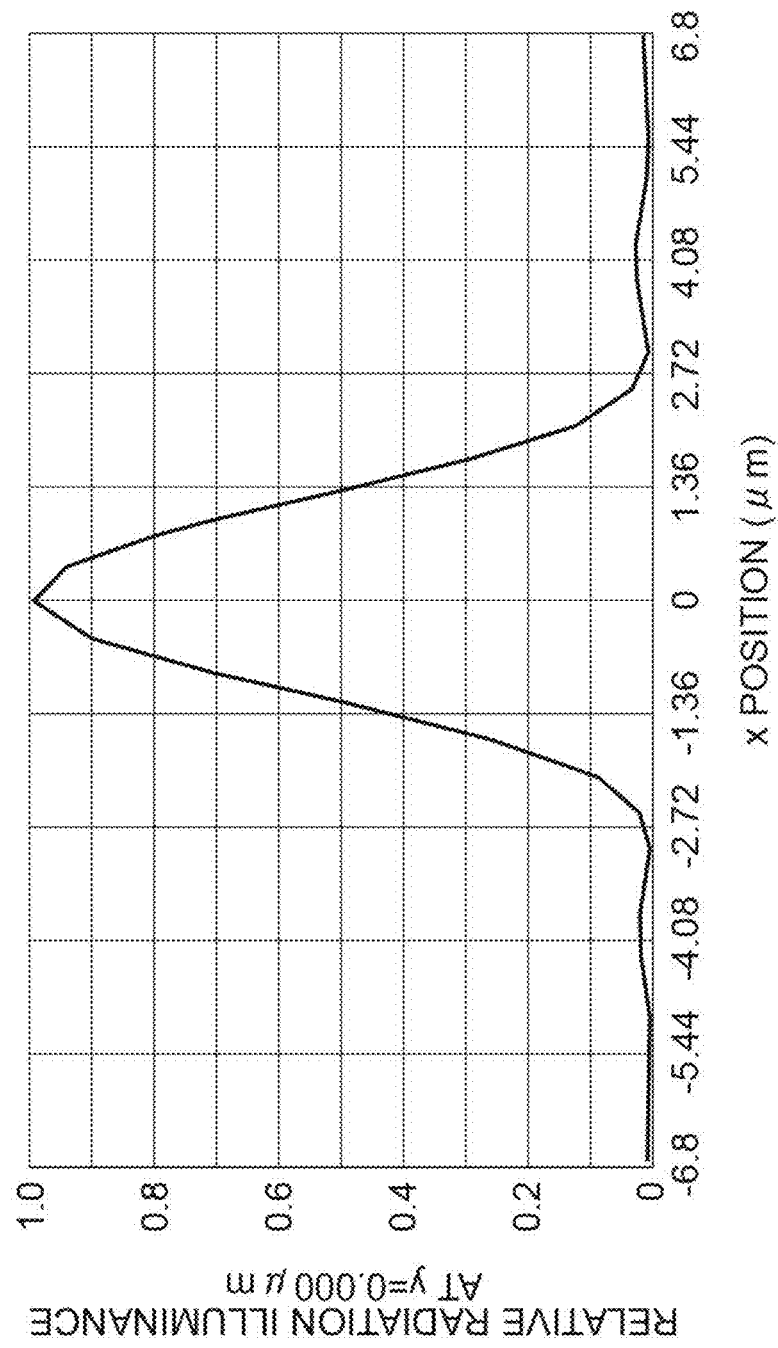
FIG. 7 is a graph obtained by actually measuring a relationship between a position and illuminance of a beam condensed to the lens shown in FIG. 4B.

Here, FIG. 6 is a graph obtained by actually measuring a relationship between a position of the beam condensed to the lens 24a and the illuminance. FIG. 7 is a graph obtained by actually measuring a relationship between a position of the beam condensed to the lens 23a and the illuminance. In each of the graphs of FIGS. 6 and 7, a horizontal axis is a relative distance (x μm) from the optical axis in a direction perpendicular to the optical axis of each of the lenses, and a vertical axis is the illuminance of $N_1$ and $N_2$ at each of the signal beam introduction ports (y=0.000 μm). In the graph of FIG. 6, a Strehl ratio was 0.883. In the graph of FIG. 7, a Strehl ratio was 0.998.

As shown in FIGS. 6 and 7, with such a configuration, it can be understood that the lenses 23a and 24a are capable of optical coupling with the same illuminance at positions corresponding to each other in each of the optical axis directions. Thus, it can be understood that the lens 23a has a function of condensing the signal beam $N_2$ having the same illuminance as that the signal beam $N_1$, which is condensed to the signal beam introduction port 52 by the lens 24a, to the signal beam introduction port 42. Therefore, sufficient optical coupling efficiency can be ensured at the signal beam introduction port 42 of the MMI unit 40.

In the coherent receiver 1, each of the lenses is disposed on the base 4. Here, when the coefficient of linear expansion of the material of each of the lenses and the coefficient of linear expansion of the material of the base 4 are significantly different, due to an influence of heat, stress is generated between each of the lenses and the base 4, and distortion may occur in each of the lenses. It is conceivable that such distortion causes a difference in an optical coupling state when a relative positional relationship between each of the lenses and the MMI units 40 and 50 is displaced. A fixing strength of each of the lenses and the base 4 may decrease.

Figure 8A:
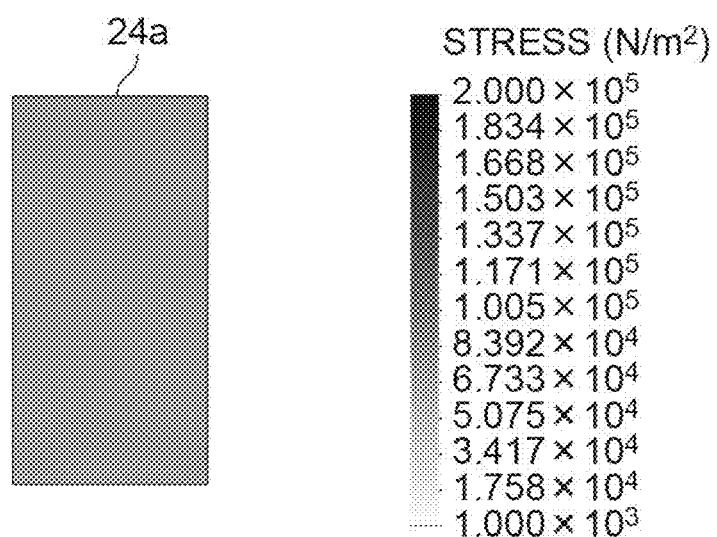
FIG. 8A is a view for explaining a stress distribution state of the lens shown in FIG. 4A.
Figure 8B:
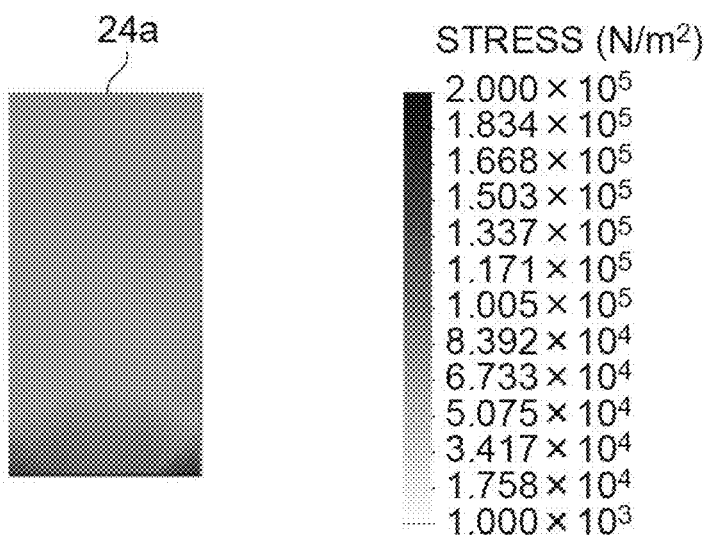
FIG. 8B is a view for explaining the stress distribution state of the lens shown in FIG. 4A in comparison with FIG. 8A.
Figure 8C:
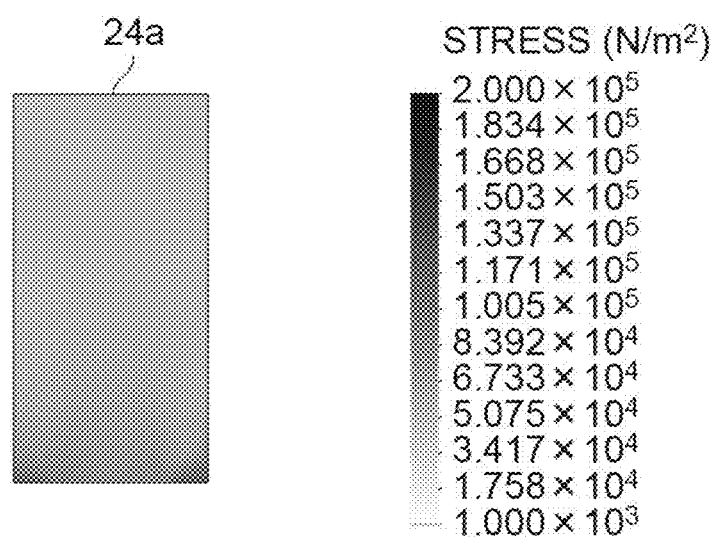
FIG. 8C is a view for explaining the stress distribution state of the lens shown in FIG. 4A in comparison with FIGS. 8A and 8B.

FIGS. 8A to 8C are diagrams for explaining a stress distribution state of the lens 24a shown in FIG. 4A. FIG. 8A shows the stress distribution state of the lens 24a mounted on a member made of alumina having a coefficient of linear expansion of $7.8 \times 10^{-6}$/K. FIG. 8B shows the stress distribution state of the lens 24a mounted on a member made of aluminum nitride. FIG. 8C shows the stress distribution state of the lens 24a mounted on a member made of mullite ($Al_6O_{13}Si_2$) having a coefficient of linear expansion of $5.3 \times 10^{-6}$/K. In FIGS. 8A to 8C, Von Mises stress is shown as the stress. It is shown that the darker the color is, the greater the stress is (refer to FIG. 8C). From FIGS. 8A, 8B and 8C, it can be understood that the stress generated in the lens 24a mounted on the member made of alumina is the smallest. Therefore, when the base 4 is made of alumina, it can be understood that stress due to a difference in a coefficient of thermal expansion between the lens 24a and the base 4 is unlikely to occur.

Figure 9A:
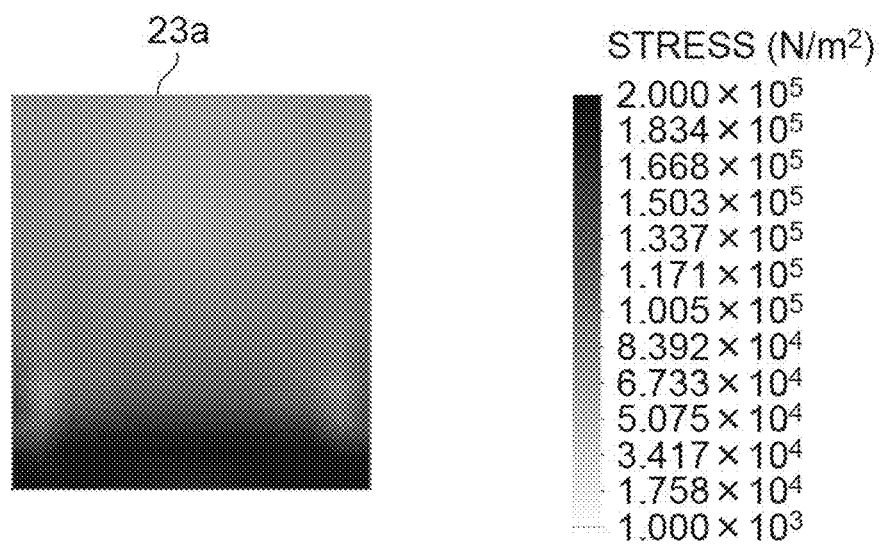
FIG. 9A is a view for explaining a stress distribution state of the lens shown in FIG. 4B.
Figure 9B:
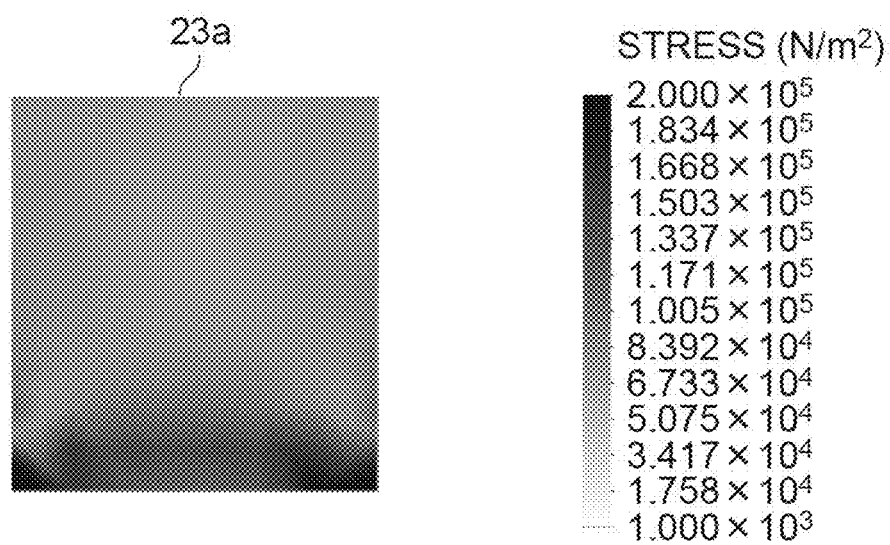
FIG. 9B is a view for explaining the stress distribution state of the lens shown in FIG. 4B in comparison with FIG. 9A.
Figure 9C:
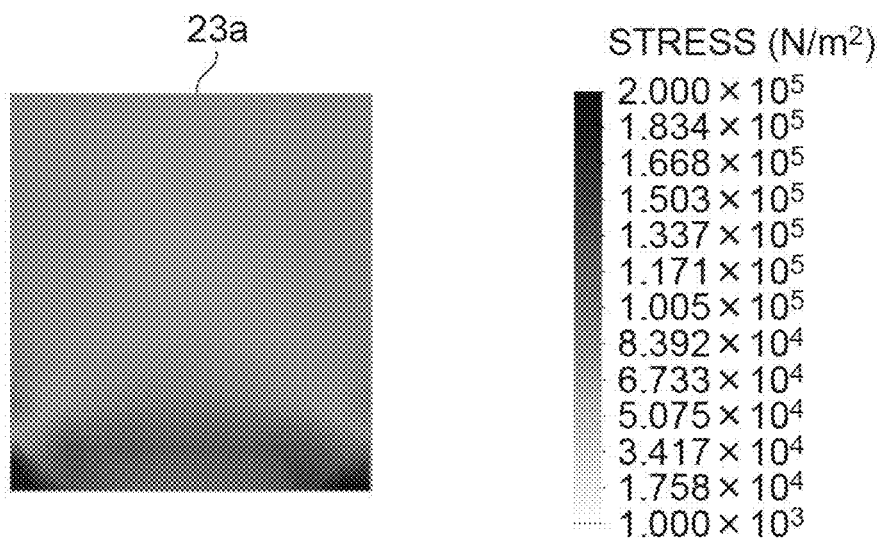
FIG. 9C is a view for explaining the stress distribution state of the lens shown in FIG. 4B in comparison with FIGS. 9A and 9B.

On the other hand, FIGS. 9A to 9C are diagrams for explaining a stress distribution state of the lens 23a shown in FIG. 4B. FIG. 9A shows the stress distribution state of the lens 23a mounted on the member made of alumina. FIG. 9B shows the stress distribution state of the lens 23a mounted on the member made of aluminum nitride. FIG. 9C shows the stress distribution state of the lens 23a mounted on the member made of mullite. Also in FIGS. 9A to 9C, Von Mises stress is shown as the stress. It is shown that the darker the color is, the greater the stress is (refer to FIG. 9C). From FIGS. 9A, 9B and 9C, it can be understood that the stress generated in the lens 23a mounted on the member made of alumina is the largest. Therefore, from FIGS. 8A, 8B, 8C, 9A, 9B and 9C, when the base 4 is made of alumina, it can be understood that stress due to the difference in the coefficient of thermal expansion between the lens 23a and the base 4 is likely to occur.

On the other hand, in the coherent receiver 1, each of the lenses is disposed on the base 4 made of aluminum nitride. Aluminum nitride has an intermediate coefficient of linear expansion between that of glass and that of silicon. Therefore, the stress between each of lenses and the base 4 is reduced. Thus, it is possible to curb occurrence of the difference in the optical coupling state, and it is possible to curb a decrease in a fixing strength between each of the lenses and the base 4. From FIG. 8B, it can be understood that even when the base 4 is made of aluminum nitride, stress due to the difference in the coefficient of thermal expansion between the lens 24a and the base 4 is unlikely to occur. From FIGS. 9A and 9B, it can be understood that the stress applied to the lens 23a can be reduced to about half as compared with the case in which the base 4 is made of alumina.

The above embodiment describes one embodiment of the optical module according to the disclosure. The optical module according to the disclosure can be arbitrarily modified from the above-described coherent receiver 1.

Figure 10:
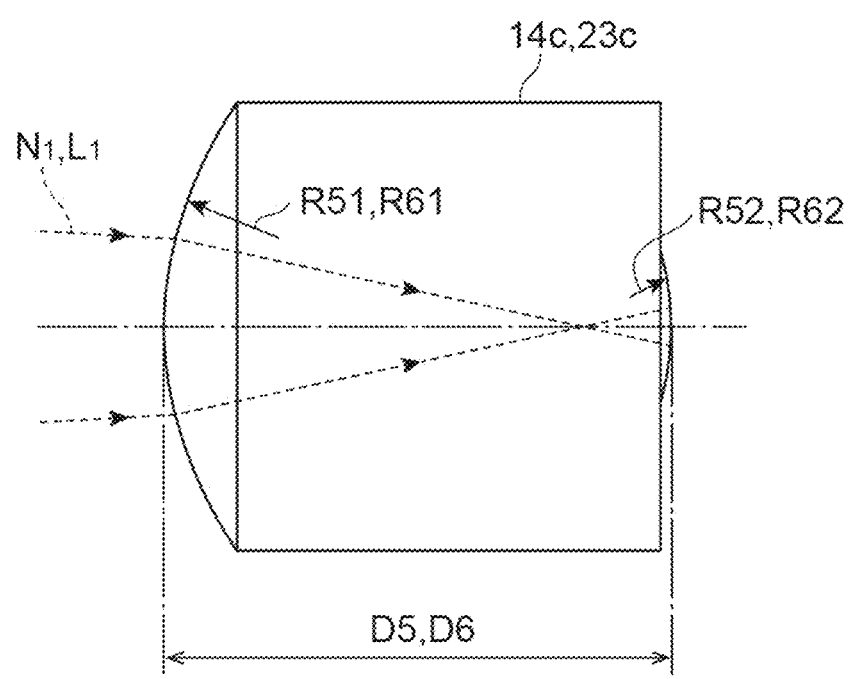
FIG. 10 is a plan view of a lens according to a modified example.

For example, the lens groups 14 and 23 have lenses 14a and 23a, but are not limited thereto. FIG. 10 is a plan view of lenses 14c and 23c according to a modified example. The lens group 14 may have a lens 14c instead of the lens 14a. The lens group 23 may have a lens 23c instead of the lens 23a. A thickness D5 of the lens 14c is larger than the thickness D3 of the lens 15a and is, for example, the same as the thickness D4 (that is, 0.96 mm) A thickness D6 of the lens 23c is larger than the thickness D1 of the lens 24a and is, for example, the same as the thickness D2 (that is, 0.96 mm).

On the other hand, shapes of cross sections of the lenses 14c and 23c passing through the optical axis is the same as the shapes of the cross sections of the lenses 15a and 24a passing through the optical axis. In the modified example, a surface of the lens 14c on the incident side is a spherical surface having a radius R51, and a surface of the lens 23c on the incident side is a spherical surface having a radius R61. The radii R51 and R61 are the same as the radii R11 and R31 (that is, 0.565 mm), respectively. A surface of the lens 23c on the emitting side is a spherical surface having a radius R52, and a surface of the lens 14c on the emitting side is a spherical surface having a radius R62. The radii R52 and R62 are the same as the radii R12 and R32 (that is, 0.404 mm), respectively.

In this case, as shown in FIG. 10, a focal point of the local beam $L_1$ is located inside the lens 14c, and a focal point of the signal beam $N_1$ is located inside the lens 23c. In this case, it is possible to optically couple the local beam $L_1$ to the MMI unit 50 by the lens 14c and to optically couple the signal beam $N_1$ to the MMI unit 40 by the lens 23c.

Each of the lens group 14 as the third condensing part and the lens group 15 as the fourth condensing part may have three or more lenses. Alternatively, the third condensing part may be configured of only the lens 14a, and the fourth condensing part may be configured of only the lens 15a. Similarly, the lens groups 23 and 24 respectively have lenses 23a and 23b and 24a and 24b, but are not limited thereto. Each of the lens group 23 as the second condensing part and the lens group 24 as the first condensing part may have three or more lenses. Alternatively, the second condensing part may be configured of only the lens 23a, and the first condensing part may be configured of only the lens 24a.

Figure 11:
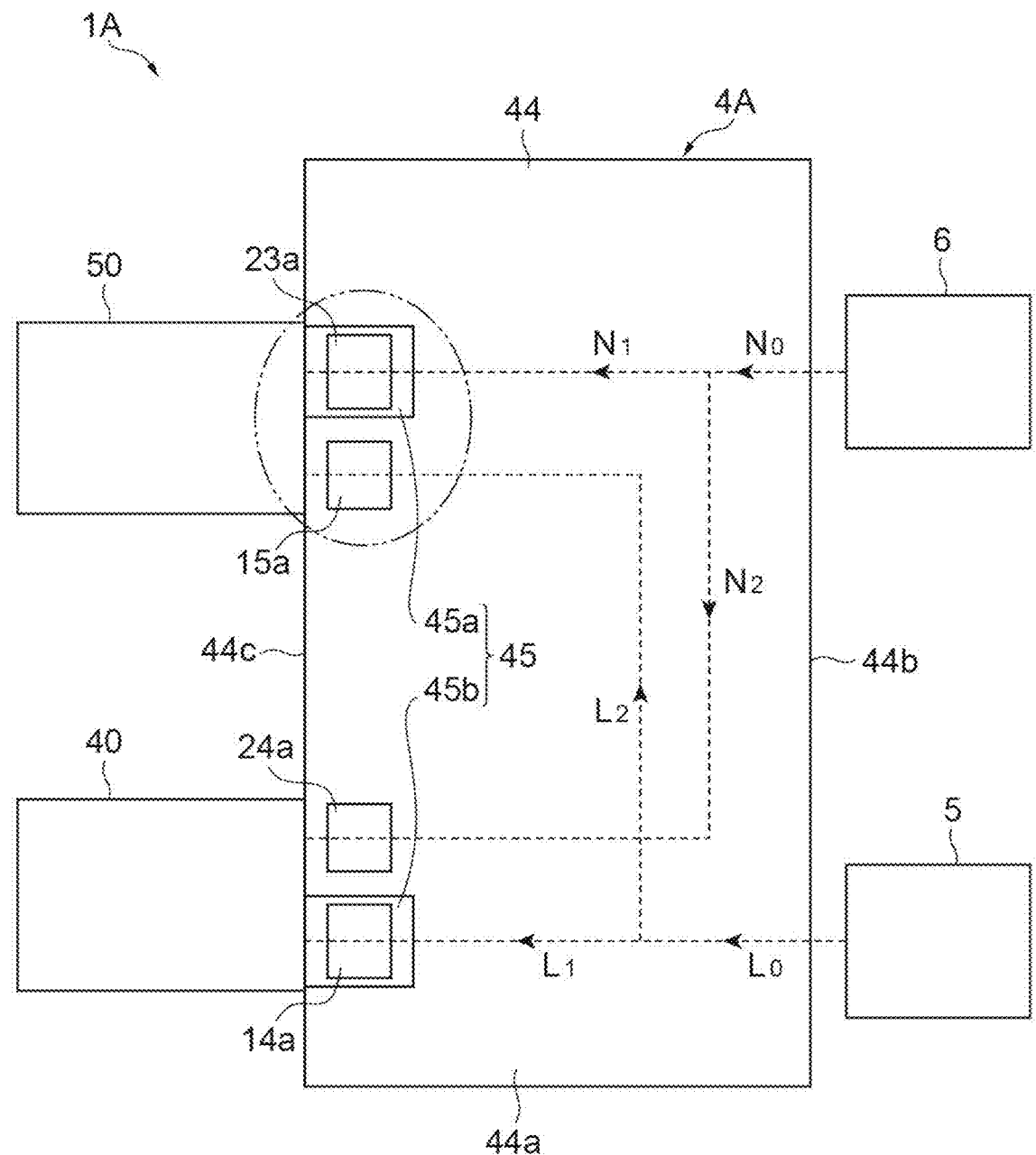
FIG. 11 is a plan view schematically showing a coherent receiver according to the modified example.
Figure 12:
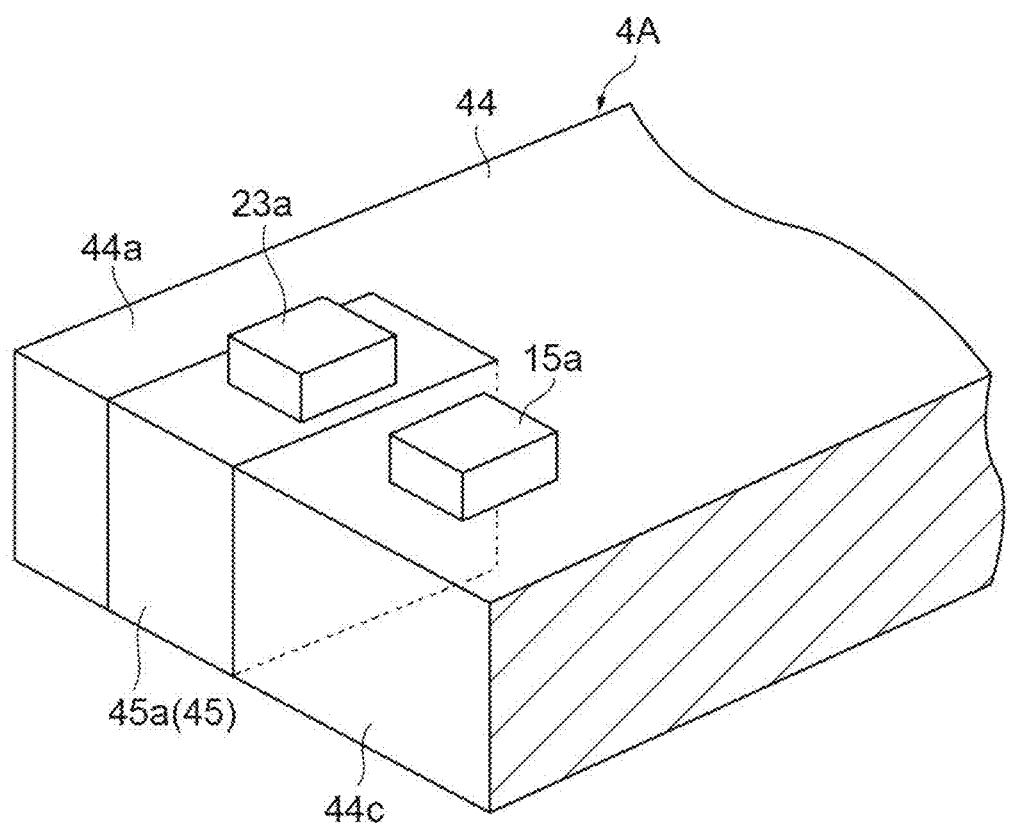
FIG. 12 is an enlarged perspective view showing a part of FIG. 10.

FIG. 11 is a plan view schematically showing a coherent receiver 1A according to a modified example. FIG. 12 is an enlarged perspective view showing a portion surrounded by an alternate long and two short dashes line in FIG. 11. The coherent receiver 1A includes a base 4A instead of the base 4. An optical system for a local beam of the coherent receiver 1A includes a lens 14a instead of the lens group 14, and a lens 15a instead of the lens group 15. An optical system for a signal beam of the coherent receiver 1A includes a lens 23a instead of the lens group 23, and a lens 24a instead of the lens group 24. The coherent receiver 1A may be configured similarly to the coherent receiver 1 in other respects. Hereinafter, differences from the coherent receiver 1 will be described.

In the modified example, the third condensing part is configured of only the lens 14a, and the fourth condensing part is configured of only the lens 15a. The second condensing part is configured of only the lens 23a, and the first condensing part is configured of only the lens 24a. The base 4A has an installation part 44 (a first installation part) and an installation part 45 (a second installation part). The installation part 44 is a substantially rectangular plate-shaped member and has a main surface 44a, a front side surface 44b, and a rear side surface 44c. Two grooves are formed in the side surface 44c to pass through the base 4A in the thickness direction and are recessed forward. The installation part 45 includes installation members 45a and 45b. As shown in FIG. 11, the installation member 45a is fitted in one groove of the installation part 44. In FIG. 11, illustration of the MMI unit 40 is omitted. The installation member 45b is fitted into the other groove of the installation part 44.

As shown in FIGS. 11 and 12, the lens 23a is disposed on the installation member 45a, and the lens 14a is installed on the installation member 45b. The lenses 15a and 24a are installed on the main surface 44a of the installation part 44. Other optical components are also mounted on the main surface 44a. The installation part 44 is made of a material having a coefficient of linear expansion (a third coefficient of linear expansion) close to the coefficient of linear expansion coefficient (a first coefficient of linear expansion) of the material of the lenses 15a and 24a. The installation part 45 is made of a material having a coefficient of linear expansion (a fourth coefficient of linear expansion) close to the coefficient of linear expansion (a second coefficient of linear expansion) of the material of the lenses 14a and 23a.

Here, an absolute value of a difference between the coefficient of linear expansion of the material of the installation part 44 and the coefficient of linear expansion of the material of the lenses 15a and 24a is smaller than an absolute value of a difference between the coefficient of linear expansion of the material of the installation part 45 and the coefficient of linear expansion of the material of the lenses 15a and 24a, and an absolute value of a difference between the coefficient of linear expansion of the material of the installation part 45 and the coefficient of linear expansion of the material of the lenses 14a and 23a is smaller than an absolute value of a difference between the coefficient of linear expansion of the material of the installation part 44 and the coefficient of linear expansion of the material of the lenses 14a and 23a. In this case, even when each of the members expands due to the influence of heat or the like, it is possible to sufficiently curb a decrease in reliability.

For example, a difference between the coefficient of linear expansion of the material of the installation part 44 and the coefficient of linear expansion of the material of the lenses 15a and 24a is $-1.4\times10^{-6}$/K or more and $23\times10^{-6}$/K or less. A difference between the coefficient of linear expansion of the material of the installation part 45 and the coefficient of linear expansion of the material of the lenses 14a and 23a is $0.5\times10^{-6}$/K or more and $1.2\times10^{-6}$/K or less in the case of silicon and aluminum nitride, and is $1.1\times10^{6}$/K or more and $1.9\times10^{-6}$/K or less in the case of silicon and mullite. As one example, the material of the lenses 15a and 24a is glass, the material of the lenses 14a and 23a is silicon, the material of the installation part 44 is alumina, and the material of the installation part 45 is aluminum nitride or mullite. Alumina has a coefficient of linear expansion close to the coefficient of linear expansion of glass, and aluminum nitride and mullite have a coefficient of linear expansion close to the coefficient of linear expansion of silicon. The coefficient of linear expansion of alumina is $6.8\times10^{-6}$/K or more and $8.5\times10^{-6}$/K or less (for example, $7.8\times10^{-6}$/K). Therefore, with such a configuration, when each of the members expands due to the influence of heat or the like, it is possible to sufficiently curb a decrease in reliability.

Also in the coherent receiver 1A, since a refractive index of the lens 23a in the optical axis direction is larger than a refractive index of the lens 24a in the optical axis direction, the adjusting component to compensate for the difference in the optical length between the signal beam $N_2$ input to the MMI unit 40 and the signal beam $N_1$ input to the MMI unit 50 can be omitted as in the coherent receiver 1, and the number of components can be reduced. Since a refractive index of the lens 14a in the optical axis direction is larger than a refractive index of the lens 15a in the optical axis direction, the adjusting component to compensate for the difference in the optical length between the local beams $L_1$ and $L_2$ can be omitted as in the coherent receiver 1. Since the refractive index of the lens 14a in the optical axis direction is larger than the refractive index of the lens 24a in the optical axis direction, the signal beam $N_2$ and the local beam $L_1$ input to the MMI unit 40 can be appropriately optically coupled while the adjusting component as described above is omitted.

REFERENCE SIGNS LIST 1, 1A, 1X, 1Y Coherent receiver
2 Housing
2a Front wall
2b Rear wall
2c Bottom wall
4, 4A Base (installation part)
4s Ground surface
5 Local beam input port
6 Signal beam input port
11 Polarizer
12 BS (second optical splitting element)
13 Reflector (second reflecting element)
14 Lens group (third condensing part)
14a Lens
14b Lens
15 Lens group (fourth condensing part)
15a Lens
15b Lens
21 PBS (first optical splitting element; optical splitting element)
22 Reflector (first reflecting element)
23 Lens group (second condensing part)
23a Lens (second lens)
23b Lens
23X Lens
24 Lens group (first condensing part)
24a Lens (first lens)
24b Lens
25 λ/2 plate
26 Skew adjusting element
30 VOA carrier
31 Variable optical attenuator
32 BS
33 Monitor PD
35 Polarization maintaining fiber
36 Single mode fiber
40 MMI unit (first element)
41 Local beam introduction port (third introduction port)
42 Signal beam introduction port (first introduction port)
43 Integrated circuit
44 Installation part (first installation part)
44a Main surface
44b, 44c Side surface
45 Installation part (second installation part)
45a, 45b Installation member
46 Circuit board
50 MMI unit (second element)
51 Local beam introduction port (fourth introduction port)
52 Signal beam introduction port (second introduction port)
53 Integrated circuit
56 Circuit board
61 Feedthrough
65 Signal output terminal
66 Terminal
67 Terminal
D1 to D4 Thickness
R11, R12, R21, R22, R31, R32, R41, R42 Radius $L_0$ Local beam
$L_1$ Local beam (first local beam)
$L_2$ Local beam (second local beam)
$N_0$ Signal beam
$N_1$ Signal beam (second polarization component; second optical component)
$N_2$ Signal beam (first polarization component; first optical component)

The invention claimed is:

1. An optical module comprising
a first optical splitting element configured to split a signal beam including a first polarization component and a second polarization component of which polarization directions are orthogonal to each other into the first polarization component and the second polarization component;
a first element having a first introduction port, the first element being configured to input the first polarization component from the first introduction port therein;
a second element having a second introduction port, the second element being configured to input the second polarization component from the second introduction port therein;
a first condensing part disposed between the first optical splitting element and the first introduction port, the first condensing part being configured to condense the first polarization component toward the first introduction port; and
a second condensing part disposed between the first optical splitting element and the second introduction port, the second condensing part being configured to condense the second polarization component toward the second introduction port,
wherein an optical path length of the first polarization component from the first optical splitting element to the first condensing part is larger than an optical path length of the second polarization component from the first optical splitting element to the second condensing part,
wherein an average refractive index of the second condensing part in an optical axis direction is larger than an average refractive index of the first condensing part in an optical axis direction, and
wherein the average refractive index of the second condensing part in the optical axis direction is between 1.2 times or more and 2.6 times or less than the average refractive index of the first condensing part in the optical axis direction.

2. The optical module according to claim 1,
wherein the first element and the second element are optical 90-degree hybrid integrated light-receiving elements, and
wherein the first element has a third introduction port and inputs a first local beam from the third introduction port therein, and the second element has a fourth introduction port and inputs a second local beam from the fourth introduction port therein, the optical module further comprising:
a signal beam input port through which the signal beam is input;
a local beam input port through which a local beam is input;
a second optical splitting element configured to split the local beam into the first local beam and the second local beam;
a third condensing part disposed between the second optical splitting element and the third introduction port, the third condensing part being configured to condense the first local beam toward the third introduction port; and
a fourth condensing part disposed between the second optical splitting element and the fourth introduction port, the fourth condensing part being configured to condense the second local beam toward the fourth introduction port,
wherein an optical path length of the second local beam from the second optical splitting element to the fourth condensing part is larger than an optical path length of the first local beam from the second optical splitting element to the third condensing part, and
wherein an average refractive index of the third condensing part in the optical axis direction is larger than an average refractive index of the fourth condensing part in the optical axis direction.

3. The optical module according to claim 2, wherein a thickness of the fourth condensing part in the optical axis direction is larger than a thickness of the third condensing part in the optical axis direction.

4. The optical module according to claim 2, further comprising a second reflecting element configured to reflect the second local beam split by the second optical splitting element, wherein
the second local beam split by the second optical splitting element is condensed to the fourth condensing part via the second reflecting element, and
the first local beam is directly condensed to the third condensing part from an output side of the second optical splitting element.

5. The optical module according to claim 2, wherein an optical length from the second optical splitting element to the third introduction port is substantially the same as an optical length from the second optical splitting element to the fourth introduction port.

6. The optical module according to claim 1, wherein a thickness of the second condensing part in the optical axis direction is larger than a thickness of the first condensing part in the optical axis direction.

7. The optical module according to claim 1, further comprising a first reflecting element configured to reflect the first polarization component split by the first optical splitting element, wherein
the first polarization component split by the first optical splitting element is condensed to the first condensing part via the first reflecting element, and
the second polarization component is directly condensed to the second condensing part from an output side of the first optical splitting element.

8. The optical module according to claim 1, wherein an optical length from the first optical splitting element to the first introduction port is substantially the same as an optical length from the first optical splitting element to the second introduction port.

9. The optical module according to claim 1, further comprising an installation part on which the first condensing part and the second condensing part are installed,
wherein the first condensing part comprises at least one first lens made of a material having a first coefficient of linear expansion, and the second condensing part comprises at least one second lens made of a material having a second coefficient of linear expansion different from the first coefficient of linear expansion,
wherein the installation part includes:

a first installation part having the at least one first lens installed thereon and being made of a material having a third coefficient of linear expansion; and a second installation part having the at least one second lens installed thereon and being made of a material having a fourth coefficient of linear expansion different from the third coefficient of linear expansion, wherein an absolute value of a difference between the third coefficient of linear expansion and the first coefficient of linear expansion is smaller than an absolute value of a difference between the fourth coefficient of linear expansion and the first coefficient of linear expansion, and wherein an absolute value of a difference between the fourth coefficient of linear expansion and the second coefficient of linear expansion is smaller than an absolute value of a difference between the third coefficient of linear expansion and the second coefficient of linear expansion.

10. An optical module comprising a first optical splitting element configured to split a signal beam including a first polarization component and a second polarization component of which polarization directions are orthogonal to each other into the first polarization component and the second polarization component;

a first element having a first introduction port, the first element being configured to input the first polarization component from the first introduction port therein;

a second element having a second introduction port, the second element being configured to input the second polarization component from the second introduction port therein;

a first condensing part disposed between the first optical splitting element and the first introduction port, the first condensing part being configured to condense the first polarization component toward the first introduction port; and a second condensing part disposed between the first optical splitting element and the second introduction port, the second condensing part being configured to condense the second polarization component toward the second introduction port, wherein an optical path length of the first polarization component from the first optical splitting element to the first condensing part is larger than an optical path length of the second polarization component from the first optical splitting element to the second condensing part, wherein an average refractive index of the second condensing part in an optical axis direction is larger than an average refractive index of the first condensing part in an optical axis direction, and wherein the first condensing part comprises at least one first lens made of any one of glass, quartz, calcium fluoride, and magnesium fluoride, and the second condensing part comprises at least one second lens made of any one of silicon, zinc selenide, and sapphire.

11. The optical module according to claim 10, wherein a material of an installation part on which the at least one first lens is installed is alumina, and a material of an installation part on which the at least one second lens is installed is aluminum nitride or mullite.

12. An optical module comprising a first optical splitting element configured to split a signal beam including a first polarization component and a second polarization component of which polarization directions are orthogonal to each other into the first polarization component and the second polarization component;

a first element having a first introduction port, the first element being configured to input the first polarization component from the first introduction port therein;

a second element having a second introduction port, the second element being configured to input the second polarization component from the second introduction port therein;

a first condensing part disposed between the first optical splitting element and the first introduction port, the first condensing part being configured to condense the first polarization component toward the first introduction port; and a second condensing part disposed between the first optical splitting element and the second introduction port, the second condensing part being configured to condense the second polarization component toward the second introduction port, wherein an optical path length of the first polarization component from the first optical splitting element to the first condensing part is larger than an optical path length of the second polarization component from the first optical splitting element to the second condensing part, and wherein an average refractive index of the second condensing part in an optical axis direction is larger than an average refractive index of the first condensing part in an optical axis direction, the optical module further comprising an installation part on which the first condensing part and the second condensing part are installed, wherein the first condensing part comprises at least one first lens made of a material having a first coefficient of linear expansion, and the second condensing part comprises at least one second lens made of a material having a second coefficient of linear expansion different from the first coefficient of linear expansion, wherein the installation part includes:

a first installation part having the at least one first lens installed thereon and being made of a material having a third coefficient of linear expansion; and a second installation part having the at least one second lens installed thereon and being made of a material having a fourth coefficient of linear expansion different from the third coefficient of linear expansion, wherein an absolute value of a difference between the third coefficient of linear expansion and the first coefficient of linear expansion is smaller than an absolute value of a difference between the fourth coefficient of linear expansion and the first coefficient of linear expansion, and wherein an absolute value of a difference between the fourth coefficient of linear expansion and the second coefficient of linear expansion is smaller than an absolute value of a difference between the third coefficient of linear expansion and the second coefficient of linear expansion.

13. The optical module according to claim 12, wherein a thickness of the second condensing part in the optical axis direction is larger than a thickness of the first condensing part in the optical axis direction.

14. The optical module according to claim 12, further comprising a first reflecting element configured to reflect the first polarization component split by the first optical splitting element, wherein the first polarization component split by the first optical splitting element is condensed to the first condensing part via the first reflecting element, and the second polarization component is directly condensed to the second condensing part from an output side of the first optical splitting element.

15. The optical module according to claim 12, wherein an optical length from the first optical splitting element to the first introduction port is substantially the same as an optical length from the first optical splitting element to the second introduction port.

* * * * *